US012529704B2

(12) United States Patent
Niculescu

(10) Patent No.: US 12,529,704 B2
(45) Date of Patent: Jan. 20, 2026

(54) METHODS FOR OBJECTIVE ASSESSMENT OF STRESS, EARLY DETECTION OF RISK FOR STRESS DISORDERS, MATCHING INDIVIDUALS WITH TREATMENTS, MONITORING RESPONSE TO TREATMENT, AND NEW METHODS OF USE FOR DRUGS

(71) Applicants: INDIANA UNIVERSITY RESEARCH AND TECHNOLOGY CORPORATION, Indianapolis, IN (US); THE UNITED STATES OF AMERICA AS REPRESENTED BY THE DEPARTMENT OF VETERANS AFFAIRS OFFICE OF GENERAL COUNSEL, Washington, DC (US)

(72) Inventor: Alexander Bogdan Niculescu, Indianapolis, IN (US)

(73) Assignees: INDIANA UNIVERSITY RESEARCH AND TECHNOLOGY CORPORATION, Bloomington, IN (US); THE UNITED STATES OF AMERICA AS REPRESENTED BY THE DEPARTMENT OF VETERANS AFFAIRS OFFICE, Washington, DC (US)

( * ) Notice: Subject to any disclaimer, the term of this patent is extended or adjusted under 35 U.S.C. 154(b) by 1129 days.

(21) Appl. No.: 16/973,687

(22) PCT Filed: Jun. 5, 2019

(86) PCT No.: PCT/US2019/035513
§ 371 (c)(1),
(2) Date: Dec. 9, 2020

(87) PCT Pub. No.: WO2019/240997
PCT Pub. Date: Dec. 19, 2019

(65) Prior Publication Data
US 2021/0255198 A1 Aug. 19, 2021

Related U.S. Application Data

(60) Provisional application No. 62/683,320, filed on Jun. 11, 2018.

(51) Int. Cl.
*G01N 33/68* (2006.01)
*C12Q 1/6883* (2018.01)
*G16H 50/20* (2018.01)

(52) U.S. Cl.
CPC ....... *G01N 33/6893* (2013.01); *C12Q 1/6883* (2013.01); *G16H 50/20* (2018.01); *G01N 2800/7004* (2013.01)

(58) Field of Classification Search
CPC ....... G01N 33/6893; G01N 2800/7004; C12Q 1/6883; G16H 50/20; A61K 31/135; A61K 31/155; A61K 31/167; A61K 31/325; A61K 31/4409; A61K 31/454; A61K 31/5375; A61K 31/546
See application file for complete search history.

(56) References Cited

U.S. PATENT DOCUMENTS

| | | | |
|---|---|---|---|
| 2011/0045998 A1* | 2/2011 | Niculescu | C12N 15/8509 506/7 |
| 2014/0073524 A1* | 3/2014 | Hood | G01N 33/6896 506/18 |
| 2016/0158213 A1 | 6/2016 | Mouthon et al. | |
| 2017/0029892 A1* | 2/2017 | Lombard | A61K 31/197 |

FOREIGN PATENT DOCUMENTS

| | | |
|---|---|---|
| WO | 2010/029176 A1 | 3/2010 |
| WO | 2013/102116 A1 | 7/2013 |
| WO | 2016201299 A1 | 12/2016 |

OTHER PUBLICATIONS

Le-Niculescu H. Identifying blood biomarkers for mood disorders using convergent functional genomics. Molecular Psychiatry 14: 156-174. (Year: 2009).*
International Search Report and Written Opinion issued by the ISA/US, Commissioner for Patents, dated Oct. 4, 2019, for International Application No. PCT/US2019/035513; 9 pages.
Savitz David A et al:"Atovaquone/Proguanil" In: "Assessment of Long-Term Health Effects of Antimalarial Drugs When Used for Prophylaxis", Mar. 24, 2020 (Mar. 24, 2020), National Academies Press, Washington, D.C., XP055934385, ISBN: 978-0-309-67210-8 pp. 217-246.

* cited by examiner

*Primary Examiner* — Olivia M. Wise
*Assistant Examiner* — Robert J. Kallal
(74) *Attorney, Agent, or Firm* — Faegre Drinker Biddle & Reath LLP

(57) ABSTRACT

Disclosed are methods for assessing severity, determining future risk, matching with a drug treatment, and measuring response to treatment, for stress disorders. Also disclosed are new methods for use for drugs and natural compounds repurposed for use in reducing stress severity, as well as for preventing and treating stress disorders. All the above mentioned methods are computer assisted methods analyzing the expression of panels of genes, clinical measures, and drug databases. A universal approach in everybody, as well as a personalized approaches by gender, and by diagnosis, are disclosed.

5 Claims, 10 Drawing Sheets
Specification includes a Sequence Listing.

SEQUENCE LISTING

<160> NUMBER OF SEQ ID NOS: 4

<210> SEQ ID NO 1
<211> LENGTH: 21
<212> TYPE: DNA
<213> ORGANISM: Artificial Sequence
<220> FEATURE:
<223> OTHER INFORMATION: Synthetic

<400> SEQUENCE: 1
ctgtcatctc ttgtgggctg t            21

```
<210> SEQ ID NO 2
<211> LENGTH: 21
<212> TYPE: DNA
<213> ORGANISM: Artificial Sequence
<220> FEATURE:
<223> OTHER INFORMATION: Synthetic

<400> SEQUENCE: 2
ggcatgacag gttttgcaat a                                              21

<210> SEQ ID NO 3
<211> LENGTH: 39
<212> TYPE: DNA
<213> ORGANISM: Artificial Sequence
<220> FEATURE:
<223> OTHER INFORMATION: Synthetic

<400> SEQUENCE: 3
cggtttgttt gggtttgggt ttgggtttgg gtttgggtt                           39

<210> SEQ ID NO 4
<211> LENGTH: 39
<212> TYPE: DNA
<213> ORGANISM: Artificial Sequence
<220> FEATURE:
<223> OTHER INFORMATION: Synthetic

<400> SEQUENCE: 4
ggcttgcctt acccttaccc ttaccttac ccttacc ct                           39
```

METHODS FOR OBJECTIVE ASSESSMENT OF STRESS, EARLY DETECTION OF RISK FOR STRESS DISORDERS, MATCHING INDIVIDUALS WITH TREATMENTS, MONITORING RESPONSE TO TREATMENT, AND NEW METHODS OF USE FOR DRUGS

CROSS-REFERENCE TO RELATED APPLICATIONS

This application is a national phase filing of International Application No. PCT/US219/035513, filed Jun. 5, 2019, which claims priority to U.S. Provisional Application Ser. No. 62/683,320, filed on Jun. 11, 2018, the disclosures of which are hereby incorporated by reference in their entirety.

STATEMENT OF GOVERNMENT SUPPORT

This invention was made with government support under OD007363 awarded by the National Institutes of Health and CX000139 merit award by the Veterans Administration. The government has certain rights in the invention.

INCORPORATION OF SEQUENCE LISTING

A paper copy of the Sequence Listing and a computer readable form of the Sequence Listing containing the file named "2018-032-02_ST25.txt", which is 1,076 bytes in size (as measured in MICROSOFT WINDOWS® EXPLORER), are provided herein and are herein incorporated by reference. This Sequence Listing consists of SEQ ID Nos: 1-4.

BACKGROUND OF THE DISCLOSURE

The present disclosure relates generally to methods for assessing high stress states, and predict future clinical events due to high stress, such as psychiatric hospitalizations with stress symptoms, using computer assisted methods and blood gene expression biomarker data. Further, the present disclosure relates to methods for matching individuals with high stress, with medications that can treat stress, and methods for monitoring response to treatment. Finally, the disclosure relates to new methods of use for candidate drugs and natural compounds repurposed for the treatment of stress.

Stress is a subjective sensation. Accordingly, stress disorders (such as PTSD) are often not properly diagnosed and treated. Stress disorders, such as post-traumatic stress disorder (PTSD), are prevalent, disabling, and underdiagnosed, in both the military and civilian realm. Stress disorders consist of mental and physical over-reaction to environmental cues that are perceived as potentially harmful, engendered by past exposure to traumatic events. The persistence, intensity, discongruence from the environment, or congruence with excessive response, are all hallmarks of clinical illness. Stress disorders affect one's ability to do things and quality of life. Due to stigma and lack of objective tests, they are often underdiagnosed, sub-optimally treated, and can lead to self-medication with alcohol and drugs. They may culminate in some cases with suicide.

There are no current objective tests to diagnose, so clinicians have to rely on the self-report of patients. An objective blood test for stress will facilitate proper diagnosis and treatment, enabling more confident treatment of those in need of it, without the stigma that it is "all in their head" and "weakness". Psychiatric patients may have an increased vulnerability to stress, regardless of their primary diagnosis, as well as increased reasons for stress disorders, due to their often adverse life trajectory. As such, they may be a particularly suitable population in which to try to identify blood biomarkers for stress that are generalizable and trans-diagnostic.

Given the negative impact of untreated stress on quality (and quantity) of life, the current lack of objective measures to determine appropriateness of treatment, and the mixed results with existing medications, the importance of approaches such as those of the present disclosure cannot be overstated.

BRIEF DESCRIPTION

The present disclosure is generally related to biomarkers and their use for tracking stress states and/or predicting a subject's risk of high stress states and/or future psychiatric hospitalizations with stress symptoms. In some embodiments, the biomarkers used herein have been found to be more universal in nature, working across psychiatric diagnoses, genders and subtypes. In other embodiments, the present disclosure relates to biomarkers identified using a personalized approach; that is, by psychiatric diagnosis, gender and subtype.

The present disclosure further relates to drugs for mitigating high stress states in subjects. Particular drugs have been found that can mitigate high stress states in subjects universally; that is, drugs that can be used for mitigating high stress states across psychiatric diagnoses, genders and subtypes of high stress states. Some drugs, however, have been found that can be used more effectively for mitigating high stress states dependent on gender, psychiatric diagnoses, subtypes and combinations thereof.

In one specific aspect, the present disclosure relates to a method of mitigating stress in a subject in need thereof, the method comprising administering a therapy to the subject, the therapy being selected from the group consisting of one or more compounds from Tables 6A-6D.

In another aspect, the present disclosure relates to a method for predicting a high stress state in a subject, the method comprising: obtaining an expression level of at least one blood biomarker from Table 2 in a sample obtained from the subject, obtaining a reference expression level of the blood biomarker; and identifying a difference between the expression level of the blood biomarker in the sample obtained from the subject and the reference expression level of the blood biomarker, wherein the difference in the expression level of the blood biomarker in the sample obtained from the subject and the reference expression level of the blood biomarker indicates a risk for a high stress state in the subject.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein:

FIG. 1A depicts cohorts used in the Example, depicting flow of discovery, prioritization, and validation of biomarkers from each step.

DETAILED DESCRIPTION

Figure 1A:
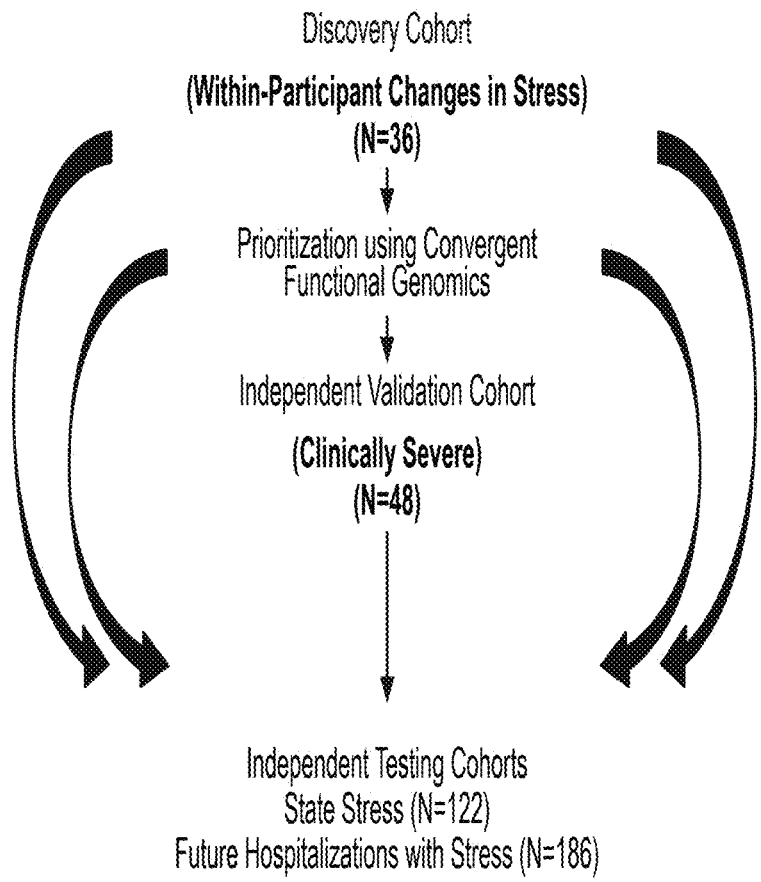
FIGS. 1A-IG depict Steps 1-3: Discovery, Prioritization and Validation of the methods used in the present disclosure.
Figure 1B:
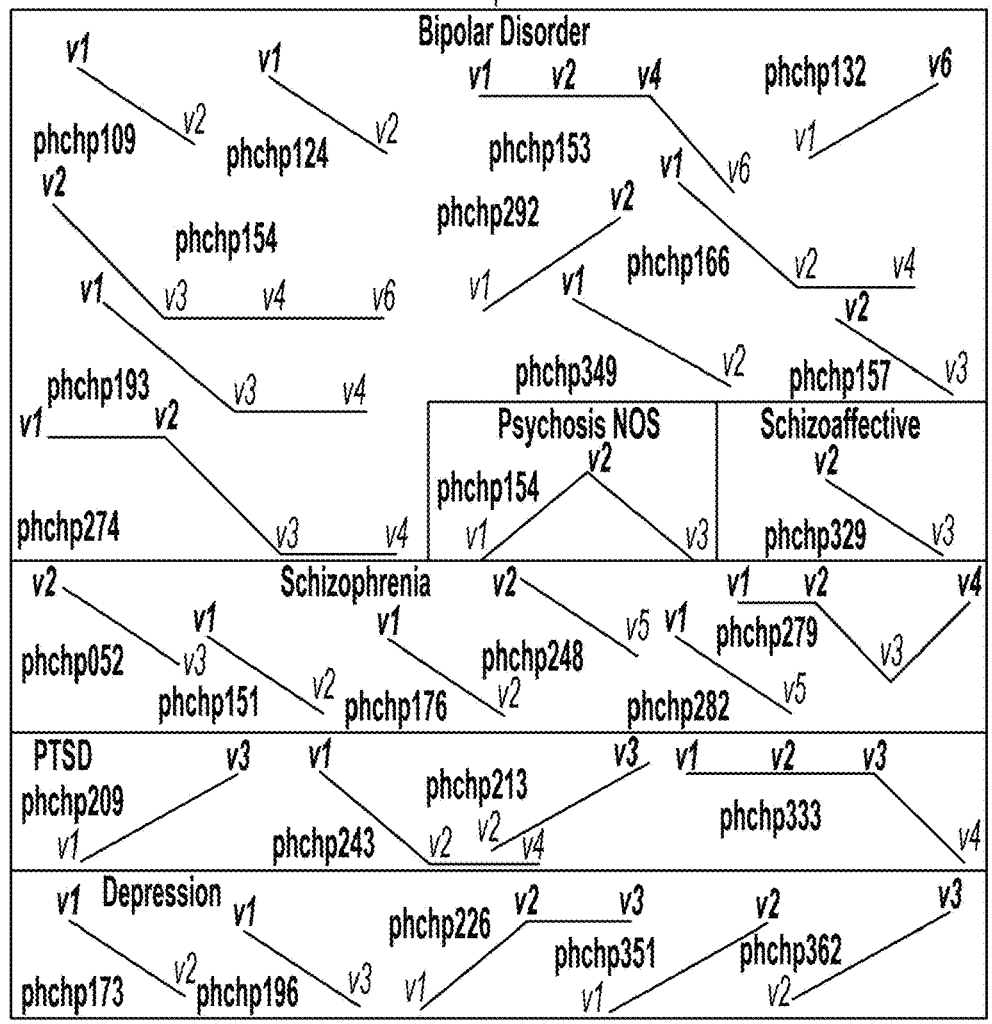
FIG. 1B depicts the discovery cohort longitudinal within-participant analysis. Phchp ### is study ID for each participant. V #denotes visit number.
Figure 1B:
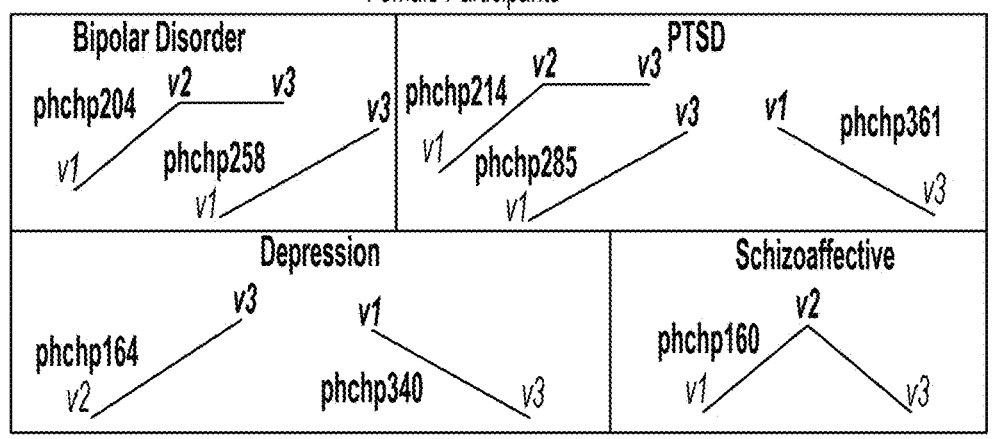

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

The present disclosure present disclosure relates generally to methods for assessing high stress states, and predict future clinical events due to high stress, such as psychiatric hospitalizations with stress symptoms, using computer assisted methods and blood gene expression biomarker data. Further, the present disclosure relates to methods for matching individuals with high stress, with medications that can treat stress, and methods for monitoring response to treatment. Finally, the invention relates to new methods of use for candidate drugs and natural compounds repurposed for the treatment of stress.

Furthermore, the predictive ability of the biomarkers discovered were examined, in a completely independent cohort, in all the participants in it, as well as divided by subtypes, and personalized by gender and diagnosis.

In additional embodiments, the present disclosure is directed to drugs for mitigating high stress states in subjects. Particular drugs have been found that can mitigate high stress states in subjects universally; that is, drugs that can be used for mitigating high stress states across psychiatric diagnoses and genders. Some drugs, however, have been found that can be used more effectively for mitigating high stress states dependent on gender, psychiatric diagnoses, and combinations thereof. Exemplary therapies include cefotiam, proguanil, hydroxyachillin. Prestwick-682, levopropoxyphene, isoflupredone, ozagrel, streptozocin, cyclopenthiazide, metformin, corticosterone, calcium folinate, diphenhydramine, ambroxol, xamoterol, botulin, isomethepene, primidone, tocainide, diloxanide, alprostadil, amphotericin B, oxolamine, and combinations thereof.

A powerful longitudinal within-subject design was used in individuals with psychiatric disorders to discover blood gene expression changes between self-reported low stress and high stress states. The list of candidate biomarkers were prioritized with a Bayesian-like Convergent Functional Genomics approach, comprehensively integrating previous human and animal model evidence in the field. The top biomarkers from discovery and prioritization were then validated in an independent cohort of psychiatric subjects with high scores on stress rating scales. The present disclosure identified a list of 116 candidate biomarkers that were nominally significant after the validation step. The candidate biomarkers were then analyzed for their abilities to predict high stress state, and future hospitalizations with stress, in another independent cohort of psychiatric subjects. The biomarkers were tested in all subjects in the test cohort, as well as in a more personalized fashion by gender and psychiatric diagnosis, showing increased accuracy with the personalized approach. The biomarkers were assessed for evidence of involvement in other psychiatric and related disorders, and the biological pathways and networks they are involved in were analyzed. The biomarkers were analyzed as targets of existing drugs for use for pharmacogenomic population stratification and measuring of response to treatment, as well as used the biomarker gene expression signature to interrogate the Connectivity Map database from Broad/MIT to identify drugs and natural compounds that can be repurposed for treating stress.

As used herein, "predicting high stress state in a subject" is used herein to indicate in advance that a subject's stress state will become elevated.

As known by those skilled in the art, "stress state" refers to thoughts, feelings, intent, and behaviors about life and environment, health, financial, and social conditions. "High stress state" refers to scoring in the upper tertile of a visual analog scale for perceived life stress (0) to 100). "Low stress state" refers to scoring in the lower tertile of a visual analog scale for perceived life stress (0 to 100). In some embodiments, the reference expression level of a biomarker can be obtained for a subject who has a low stress state at the time the sample is obtained from the subject, but who later exhibits a high stress state.

As used herein, "a reference expression level of a biomarker" refers to the expression level of a biomarker established for a subject with a low stress state, expression level of a biomarker in a normal/healthy subject with a low stress state as determined by one skilled in the art using established methods as described herein, and/or a known expression level of a biomarker obtained from literature. The reference expression level of the biomarker can further refer to the expression level of the biomarker established for a high stress state subject, including a population of high stress state subjects. The reference expression level of the biomarker can also refer to the expression level of the biomarker established for a low stress state subject, including a population of low stress state subjects. The reference expression level of the biomarker can also refer to the expression level of the biomarker established for any combination of subjects such as a subject with a low stress state, expression level of the biomarker in a normal/healthy subject with a low stress state, expression level of the biomarker for a subject who has a low stress state at the time the sample is obtained from the subject, but who later exhibits a high stress state, expression level of the biomarker as established for a high stress state subject, including a population of high stress state subjects, and expression level of the biomarker can also refer to the expression level of the biomarker established for a low stress state subject, including a population of low stress state subjects. The reference expression level of the biomarker can also refer to the expression level of the biomarker obtained from the subject to which the method is applied. As such, the change within a subject from visit to visit can indicate an increased or decreased stress state. For example, a plurality of expression levels of a biomarker can be obtained from a plurality of samples obtained from the same subject and used to identify differences between the plurality of expression levels in each sample. Thus, in some embodiments, two or more samples obtained from the same subject can provide an expression level(s) of a blood biomarker and a reference expression level(s) of the blood biomarker.

As used herein, "expression level of a biomarker" refers to the process by which a gene product is synthesized from a gene encoding the biomarker as known by those skilled in the art. The gene product can be, for example, RNA (ribonucleic acid) and protein. Expression level can be quantitatively measured by methods known by those skilled in the art such as, for example, northern blotting, amplification, polymerase chain reaction, microarray analysis, tag-based technologies (e.g., serial analysis of gene expression and next generation sequencing such as whole transcriptome shotgun sequencing or RNA-Seq), Western blotting, enzyme linked immunosorbent assay (ELISA), and combinations thereof.

As used herein, a "difference" in the expression level of the biomarker refers to an increase or a decrease in the expression of a blood biomarker when analyzed against a reference expression level of the biomarker. In some embodiments, the "difference" refers to an increase or a decrease by about 1.2-fold or greater in the expression level of the biomarker as identified between a sample obtained from the subject and the reference expression level of the biomarker. In one embodiment, the difference in expression level is an increase or decrease by about 1.2 fold. As used herein "a risk for high stress state" can refer to an increased (greater) risk that a subject will reach a high stress state. For example, depending on the biomarker(s) selected, the difference in the expression level of the biomarker(s) can indicate an increased (greater) risk that a subject will reach a high stress state. Conversely, depending on the biomarker(s) selected, the difference in the expression level of the biomarker(s) can indicate a decreased (lower) risk that a subject will reach a high stress state.

In accordance with the present disclosure, biomarkers useful for objectively predicting, mitigating, and/or preventing high stress states in subjects have been discovered. In one aspect, the present disclosure is directed to a universal method for predicting high stress state in a subject; that is, a method for predicting high stress state across all psychiatric diagnoses and for either gender. The method includes obtaining a reference expression level of a blood biomarker; and determining an expression level of the blood biomarker in a sample obtained from the subject. A change in the expression level of the blood biomarker in the sample obtained from the subject as compared to the reference expression level indicates a risk to reaching a level of high stress.

In one embodiment, the expression level of the blood biomarker in the sample obtained from the subject is increased as compared to the reference expression level of the biomarker. It has been found that an increase in the expression level of particular blood biomarkers in the sample obtained from the subject as compared to the reference expression level of the biomarker indicates a risk for high stress state. Suitable biomarkers that indicate a risk for high stress state when the expression level increases can be, for example, one or more biomarkers as listed in Table 2 and combinations thereof.

In another embodiment, the expression level of the blood biomarker in the sample obtained from the subject is decreased as compared to the reference expression level of the biomarker. Suitable biomarkers that indicate a risk for high stress state when the expression level decreases as compared to the reference expression level have been found to include, for example, one or more biomarkers as listed in Table 2 and combinations thereof.

Particularly suitable subjects are humans. Suitable subjects can also be experimental animals such as, for example, monkeys and rodents, that display a behavioral phenotype associated with high stress states. In one particular aspect, the subject is a female human. In another particular aspect, the subject is a male human, and in another particular aspect, the subject is a male depressed human.

A particularly suitable sample for which the expression level of a biomarker is determined can be, for example, blood, including whole blood, serum, plasma, leukocytes, and megakaryocytes.

Various functions and advantages of these and other embodiments of the present disclosure will be more fully understood from the examples shown below. The examples are intended to illustrate the benefits of the present disclosure, but do not exemplify the full scope of the disclosure.

Example

In this Example, biomarkers were assessed for tracking stress states, predicting high stress states, and predicting psychiatric hospitalizations with stress symptoms.

Materials and Methods

Cohorts

Three independent cohorts were used: discovery (major psychiatric disorders with changes in state stress), validation (major psychiatric disorders with clinically severe trait and state stress), and testing (an independent major psychiatric disorders cohort for predicting state stress, and for predicting trait future hospitalization visits with stress as the primary reason) (FIG. 1A).

Participants were recruited from the patient population at the Indianapolis VA Medical Center. All participants understood and signed informed consent forms detailing the research goals, procedure, caveats and safeguards, per IRB approved protocol. Participants completed diagnostic assessments by an extensive structured clinical interview-Diagnostic Interview for Genetic Studies, and up to six testing visits, 3-6 months apart or whenever a new psychiatric hospitalization occurred. At each testing visit, they received a series of rating scales, including a self-report visual analog scale (1-100) for quantitatively assessing state stress at that particular moment in time (Simplified Stress Scale-SSS), which has 4-items (Life Stress, Financial Stress, Health Stress and Social Stress). A PTSD Checklist-Civilian Version (PCL-C) scale, which measures clinical severity of trait stress symptoms over the month preceding testing, was also administered. Whole blood (10 ml) was collected in two RNA-stabilizing PAXgene tubes, labeled with an anonymized ID number, and stored at −80° C. in a locked freezer until the time of future processing. Whole-blood RNA was extracted for microarray gene expression studies from the PAXgene tubes, as detailed below.

For this Example, the within-participant discovery cohort, from which the biomarker data were derived, consisted of 36 participants (28 males, 8 females) with multiple testing visits, who each had at least one diametric change in stress state from low stress state (VAS Life Stress score of ≤33/100) to a high stress state (Life Stress score of ≥67). At least one of the other items (Health Stress, Financial Stress or Social Stress) having concording low or high score with the Life Stress ((FIGS. 1A-1G) was required.

The validation cohort, in which the top biomarker findings were validated for being even more strongly changed in expression compared to the discovery cohort, consisted of 35 male and 13 female participants with both high trait stress (PTSD PCL-C scale scores≥50, indicating clinically severe stress) and high state stress (VAS Life Stress score of ≥67). (Table 1).

TABLE 1

| | | | Demographics | | | |
|---|---|---|---|---|---|---|
| | Number of participants | Gender | Diagnosis | Ethnicity | Age Mean (SD) | T-test for age |
| | | | Discovery | | | |
| Discovery Cohort (Within-Participant Changes in Life Stress VAS) Low-Life Stress VAS <=33 High-Life Stress VAS >=67 Concordance with 1 other item (Health Stress, Financial Stress, Social Stress) | 36 (with 91 visits) | Male = 28 Female = 8 | Dx Subjects (Visits) BP 14 (38) MDD 7(15) PSYCH 1(3) PTSD 6(16) SZ 6(14) SZA 2(5) | EA = 25 AA = 10 Hispanic = 1 | All = 49.8022 (10.3754) Low Stress = 50.31 High Stress = 49.30 | T-test for age between Low Stress and High Stress 0.645943 |
| | | | Validation | | | |
| Independent Validation Cohort (Clinically Severe Stress) PCL-C >=50 Life Stress VAS >=67 | 48 | Male = 35 Female = 13 | MDD = 13 BP = 8 SZ = 2 SZA = 7 PTSD = 13 MOOD = 4 | EA = 37 AA = 10 | 48.96 (8.4) | T-test for age between Discovery vs. Validation 0.56523437 |
| | | | Testing | | | |
| Independent Testing Cohort For Predicting High Stress State Life Stress VAS >=67 at Time of Assessment) | 122 | Male = 95 Female = 27 | BP = 53 MDD = 24 SZA = 15 SZ = 17 PTSD = 9 MOOD = 1 PSYCH = 3 | EA = 89 AA = 31 Mixed = 1 Hispanic = 1 | All = 45.5 (9.93) Low Stress = 46.2 High Stress = 44.03 | T-test for age Low and Intermediate Stress vs. High Stress 0.50720396 |
| Independent Testing Cohort For Predicting Trait (Hospitalizations visits with Stress in the First Year Following Assessment) | 162 | Male = 144 Female = 18 | BP = 50 MDD = 27 SZA-32 SZ = 39 PTSD = 8 MOOD = 3 PSYCH = 8 | EA = 101 AA = 58 Mixed = 1 Hispanic = 2 | All = 50.4 (8.19) Hosp with no Stress = 48.6 Hosp with Stress = 47.9 | T-test for age Hosp with no Stress vs. Hosp with Stress within the first Year 0.7001408 |

TABLE 1-continued

Demographics

| | Number of participants | Gender | Diagnosis | Ethnicity | Age Mean (SD) | T-test for age |
|---|---|---|---|---|---|---|
| Independent Testing Cohort For Predicting Trait (Hospitalizations visits with Stress Stress in All Future Years Following Assessment) | 186 | Male = 166 Female = 20 | BP = 56 MDD = 30 SZA = 47 SZ = 39 PTSD = 8 MOOD = 3 PSYCH = 3 | EA = 119 AA = 64 Mixed = 1 Hispanic = 2 | All = 50.45 (8.86) Hosp with no Stress = 50.55 Hosp with Stress = 50.12 | T-test for age Hosp with no Stress vs. Hosp with Stress in Future Years 0.65942853 |

The independent test cohort for predicting state high stress consisted of 95 male and 27 female participants with psychiatric disorders, demographically matched with the discovery cohort, with one or multiple testing visits in the lab, with either low stress, intermediate stress, or high stress (FIGS. 1A-1G and Table 1).

The test cohort for predicting trait future hospitalization visits with stress symptoms, in the first year of follow-up, and all future hospitalization visits with stress symptoms (FIGS. 1A-1G) consisted of 166 males and 20 female participants for which there was a longitudinal follow-up with electronic medical records. The participants' subsequent number of hospitalization with stress symptoms in the year following testing was tabulated from electronic medical records by a clinical researcher, who examined admission and discharge summaries.

Medications. The participants in the discovery cohort were all diagnosed with various psychiatric disorders, and had various medical co-morbidities (Table 2). Their medications were listed in their electronic medical records, and documented at the time of each testing visit. Medications can have a strong influence on gene expression. However, the discovery of differentially expressed genes was based on within-participant analyses, which factor out not only genetic background effects, but also minimizes medication effects, as the participants rarely had major medication changes between visits. Moreover, there was no consistent pattern of any particular type of medication, as the participants were on a wide variety of different medications, psychiatric and non-psychiatric. Some participants may be non-compliant with their treatment and may thus have changes in medications or drug of abuse not reflected in their medical records. That being said, the goal was to find biomarkers that track stress, regardless if the reason for it is endogenous biology or driven by substance abuse or medication non-compliance. In fact, one would expect some of these biomarkers to be targets of medications. Overall, the discovery of biomarkers with this design occurs despite the participants having different genders, diagnoses, being on various different medications, and other lifestyle variables

TABLE 2

Convergent Functional Evidence (CFE) for Best Predictive Biomarkers for Stress (n = 41 genes, 42 probesets). After Step 4 Testing in independent cohorts for state and trait predictions. Telomere Length (TL) was chosen as a literature based positive control/comparator. FKBP5 is the gene with the most consistent evidence across all steps in our work, and a de facto positive control based on its extensive prior evidence in the field.

| Gene Symbol/ Gene Name | Probe-sets | Step 1 Discovery in Blood (Direction of Change) Method/ Score/% 6 pts | Step 2 External CFG Evidence For Involvement in Stress Score 12 pts | Step 3 Validation in Blood ANOVA p-value/ Score 6 pts | Step 4 Best Significant Prediction of Stress ROC AUC/ p-value 8 pts All 6 pts Gender 4 pts Gender/Dx | Step 4 Best Significant Prediction of First Year Hosp Visits with Stress ROC AUC/ p-value 8 pts All 6 pts Gender 4 pts Gender/Dx | Step 4 Best Significant Predictions of All Future Hosp visits with Stress OR/OR p-value 8 pts All 6 pts Gender 4 pts Gender/Dx | Step 5 Other Psychiatric and Related Disorders Evidence-Change in same direction as stress 3 pts | Step 6 Drugs that Modulate the Biomarker in Opposite Direction to Stress 3 pts | CFE Poly-evi-dence Score |
|---|---|---|---|---|---|---|---|---|---|---|
| TL Telomere Length Reference marker from literature | NA | NA | 7 | NS | Gender/ Dx M-MDD C: (2/14) 1/1.42E-02 | All C: (14/108) 0.72/4.82E-03 Gender Male C (14/86) | | Aging Alcohol Depression Mania Psychosis | Omega-3 Fatty acids Lithium Meditation Olanzapine Mianserin | 25 |

TABLE 2-continued

Convergent Functional Evidence (CFE) for Best Predictive Biomarkers for Stress (n = 41 genes, 42 probesets). After Step 4 Testing in independent cohorts for state and trait predictions. Telomere Length (TL) was chosen as a literature based positive control/comparator. FKBP5 is the gene with the most consistent evidence across all steps in our work, and a de facto positive control based on its extensive prior evidence in the field.

| Gene Symbol/ Gene Name | Probe-sets | Step 1 Discovery in Blood (Direction of Change) Method/ Score/% 6 pts | Step 2 External CFG Evidence For Involvement in Stress Score 12 pts | Step 3 Validation in Blood ANOVA p-value/ Score 6 pts | Step 4 Best Significant Prediction of Stress ROC AUC/ p-value 8 pts All 6 pts Gender 4 pts Gender/Dx | Step 4 Best Significant Prediction of First Year Hosp Visits with Stress ROC AUC/ p-value 8 pts All 6 pts Gender 4 pts Gender/Dx | Step 4 Best Significant Predictions of All Future Hosp visits with Stress OR/OR p-value 8 pts All 6 pts Gender 4 pts Gender/Dx | Step 5 Other Psychiatric and Related Disorders Evidence-Change in same direction as stress 3 pts | Step 6 Drugs that Modulate the Biomarker in Opposite Direction to Stress 3 pts | CFE Poly-evidence Score |
|---|---|---|---|---|---|---|---|---|---|---|
| | | | | | 0.73/3.21 E−03 Gender/ Dx M-MDD C: (4/17) 0.90/ 8.71E−03 M-BP C: (9/55 0.68/4.19E−02 | | | | | |
| FKBP5 FK506 Binding Protein 5 | 2248 56_at | (D) DE/453.8% | 12 | 1.22E−02/ 4 Nominal | Gender Female C: (13/60) 0.65/4.85E−02 Gender/ Dx F-BP C: (6/22) 0.82/1.11E−02 | Gender/ Dx M-MDD C: (5/49) 0.75/3.72E−02 M-MDD L: (2/27) 0.9/3.20E−02 | Gender/ Dx M-SZ L: (8/56) 4.6/3.94E−02 | Alcohol Anxiety BP Depression MDD Pain Psychosis Unipolar Depression Suicide | Mood Stabilizers Psycho-therapy | 40 |
| *DDX6* DEAD-Box Helicase 6 | 1562 836_ at | (I) DE/ 683.8% (I) AP/690.2% | 9 | Not Stepwise | All L: (13/134) 0.64/4.79E−02 Gender Female C: (13/60) 0.7/1.60E−02 Female L: (5/33) 0.79/2.23E−02 Gender/ Dx F-BP C: (6/22) 0.82/1.11E−02 F-BP L: (2/12) 0.9/4.28E−02 M-PSYCHOSIS C: (5/47) 0.73/4.88E−02 M-PSYCHOSIS L: (2/24) 0.95/1.84E−02 M-SZ C: (4/29) 0.87/9.64E−03 | All L: (14/234) 0.63/4.59E−02 Gender Male L: (14/206) 0.64/4.00E−02 Gender/ Dx M-BP L (10/77) 0.71/1.63E−02 | All L: (62/286) 1.3/4.41E−02 Gender Male L: (59/253) 1.4/1.66E−02 Gender/ Dx M-BP L (24/91) 1.8/2.75E−05 | Alcohol BP Other Substances/ Addictions MDD Yohimbine Suicide | | 36 |

TABLE 2-continued

Convergent Functional Evidence (CFE) for Best Predictive Biomarkers for Stress (n = 41 genes, 42 probesets). After Step 4 Testing in independent cohorts for state and trait predictions. Telomere Length (TL) was chosen as a literature based positive control/comparator. FKBP5 is the gene with the most consistent evidence across all steps in our work, and a de facto positive control based on its extensive prior evidence in the field.

| Gene Symbol/ Gene Name | Probe-sets | Step 1 Discovery in Blood (Direction of Change) Method/ Score/% 6 pts | Step 2 External CFG Evidence For Involvement in Stress Score 12 pts | Step 3 Validation in Blood ANOVA p-value/ Score 6 pts | Step 4 Best Significant Prediction of Stress ROC AUC/ p-value 8 pts All 6 pts Gender 4 pts Gender/Dx | Step 4 Best Significant Prediction of First Year Hosp Visits with Stress ROC AUC/ p-value 8 pts All 6 pts Gender 4 pts Gender/Dx | Step 4 Best Significant Predictions of All Future Hosp visits with Stress OR/OR p-value 8 pts All 6 pts Gender 4 pts Gender/Dx | Step 5 Other Psychiatric and Related Disorders Evidence-Change in same direction as stress 3 pts | Step 6 Drugs that Modulate the Biomarker in Opposite Direction to Stress 3 pts | CFE Poly-evi-dence Score |
|---|---|---|---|---|---|---|---|---|---|---|
| B2M Beta-2-Micro-globulin | 2323 11_at | (I) DE/ 691.2% | 5 | Not Stepwise | M-SZ L: (2/15) 1/1.36E−02 Gender/ Dx F-PSYCHOSIS C: (4/19) 0.93/4.66E−03 F-SZA C: (3/13) 0.9/2.13E−02 | Gender Female C: (2/46) 0.94/1.78E−02 | All C: (113/474) 1.2/3.09E−02 L: (62/286) 1.5/9.79E−03 Gender Female C: (7/53) 1.8/4.87E−02 Male L: (59/253) 1.5/6.83E−03 Gender/ Dx M-BP C (41/140) 1.4/2.02E−03 M-BP L. (24/91) 2.3/5.64E−04 | Alcohol Aging Autism Eating Disorder MDD Depression Pain Suicide | Omega-3 fatty acids, 4'-iodo-4'-deoxy-doxo-rubicin | 35 |
| LAIR1 Leukocyte Associated Immuno-globulin Like Receptor 1 | 2106 44_s_at | (D) DE/ 686.2% | 4 | 1.12E−02/ 4 Nominal | Gender Female L: (5/33) 0.75/3.94E−02 | Gender/ Dx M-PSYCHOSIS L: (2/95) 0.85/4.35E−02 | All L: (62/286) 1.7/1.68E−03 Gender Male L: (59/253) 1.7/2.09E−03 Gender/ Dx M-BP L: (24/91) 2/1.76E−02 M-PSYCHOSIS L: (29/121) 1.7/1.22E−02 | Suicide | | 35 |
| RTN4 Reticulon 4 | 1556 049_at | (I) DE/ 454.4% | 9 | Not Stepwise | | All C: (32/398) 0.63/9.49E−03 Gender Female | All C: (113/474) 1.18/2.26-02 Gender Male | Alcohol BP Suicide Pain | Omega-3 fatty acids Valproate | 35 |

TABLE 2-continued

Convergent Functional Evidence (CFE) for Best Predictive Biomarkers for Stress (n = 41 genes, 42 probesets). After Step 4 Testing in independent cohorts for state and trait predictions. Telomere Length (TL) was chosen as a literature based positive control/comparator. FKBP5 is the gene with the most consistent evidence across all steps in our work, and a de facto positive control based on its extensive prior evidence in the field.

| Gene Symbol/ Gene Name | Probe-sets | Step 1 Discovery in Blood (Direction of Change) Method/ Score/% 6 pts | Step 2 External CFG Evidence For Involvement in Stress Score 12 pts | Step 3 Validation in Blood ANOVA p-value/ Score 6 pts | Step 4 Best Significant Prediction of Stress ROC AUC/ p-value 8 pts All 6 pts Gender 4 pts Gender/Dx | Step 4 Best Significant Prediction of First Year Hosp Visits with Stress ROC AUC/ p-value 8 pts All 6 pts Gender 4 pts Gender/Dx | Step 4 Best Significant Predictions of All Future Hosp visits with Stress OR/OR p-value 8 pts All 6 pts Gender 4 pts Gender/Dx | Step 5 Other Psychiatric and Related Disorders Evidence- Change in same direction as stress 3 pts | Step 6 Drugs that Modulate the Biomarker in Opposite Direction to Stress 3 pts | CFE Poly- evi- dence Score |
|---|---|---|---|---|---|---|---|---|---|---|
| | | | | | | C: (2/46) 0.85/4.75-02 Male C: (30/352) 0.61/2.32-02 | C: (106/421) 1.16/4.30-02 Gender/ Dx M-BP C: (41/140) 1.29/4.95-02 M-MDD C: (9/57) 2.21/1.33-02 F-SZA C: (3/12) 5.4/4.76-02 | | | |
| NUB1 Negative Regulator Of Ubiquitin Like Proteins 1 | 1560 108_ at (1560 108_ at) | (I) DE/ 461.8% | 8 | 2.34E-02/ 4 Nominal (6.22E-04/ 4 Top Nominal) | All C: (38/258) 0.65/1.42E-03 Gender Female C. (13/60) 0.74/3.96E-03 Male C: (25/198) 0.6/4.70E-02 Gender/ Dx F-BP C: (6/22) 0.78/2.33E-02 | | Gender/ Dx M- PSYCHOSIS C: (52/201) 1.2/2.72E-02 L. (29/121) 1.5/1.37E-02 M-SZ L: (8/56) 1.6/2.20E-02 | Autism Suicide | Antipsy chotics | 34 |
| CIRBP Cold Inducible RNA Binding Protein | 2008 11_at | (D) DE/ 469.2% | 4 | 3.66E-02/ 4 Nominal | Gender Female C: (13/60) 0.65/4.67E-02 Gender/ Dx F-BP C: (6/22) 0.76/3.27E-02 F-BP L: (2/12) 1/1.58-02 | All L: (14/234) 0.68/1.19E-02 Gender Male L: (14/206) 0.68/1.17E-02 Gender/ Dx M-BP L: (10/77) 0.67/4.63E-02 M-SZ C: (3/74) 0.79/4.59E-02 | Gender/ Dx M-BP L: (24/91) 1.9/1.99E-02 M-MDD L: (4/32) 13/3.39E-02 M-SZ L: (8/56) 4.1/1.23E-02 | Autism SZ | | 33 |

TABLE 2-continued

Convergent Functional Evidence (CFE) for Best Predictive Biomarkers for Stress (n = 41 genes, 42 probesets). After Step 4 Testing in independent cohorts for state and trait predictions. Telomere Length (TL) was chosen as a literature based positive control/comparator. FKBP5 is the gene with the most consistent evidence across all steps in our work, and a de facto positive control based on its extensive prior evidence in the field.

| Gene Symbol/ Gene Name | Probe-sets | Step 1 Discovery in Blood (Direction of Change) Method/ Score/% 6 pts | Step 2 External CFG Evidence For Involvement in Stress Score 12 pts | Step 3 Validation in Blood ANOVA p-value/ Score 6 pts | Step 4 Best Significant Prediction of Stress ROC AUC/ p-value 8 pts All 6 pts Gender 4 pts Gender/Dx | Step 4 Best Significant Prediction of First Year Hosp Visits with Stress ROC AUC/ p-value 8 pts All 6 pts Gender 4 pts Gender/Dx | Step 4 Best Significant Predictions of All Future Hosp visits with Stress OR/OR p-value 8 pts All 6 pts Gender 4 pts Gender/Dx | Step 5 Other Psychiatric and Related Disorders Evidence-Change in same direction as stress 3 pts | Step 6 Drugs that Modulate the Biomarker in Opposite Direction to Stress 3 pts | CFE Poly-evi-dence Score |
|---|---|---|---|---|---|---|---|---|---|---|
| CYP2E1 Cytochrome P450 Family 2 Subfamily E Member 1 | 209976_s_at | (I) DE/ 244.1% | 6 | 1.57E−02/ 4 Nominal | Gender/ Dx F-BP C: (6/22) 0.78/2.33E−02 M-MDD C: (6/35) 0.77/1.98E−02 | All C: (32/398) 0.6/3.41E−02 Gender Male C: (30/352) 0.63/1.09E−02 Gender/ Dx M-PSYCHOSIS C: (8/161) 0.74/1.04E−02 M-SZA C: (5/87) 0.82/7.64E−03 | Gender Male L (59/253) 1.3/4.96E−02 Gender/ Dx M-PSYCHOSIS L: (29/121) 1.6/9.44E−03 M-SZ C: (13/93) 1.4/3.85E−02 M-SZ L: (8/56) 2.1/2.50E−03 | Alcohol SZ Suicide | | 33 |
| MAD1L1 MAD1 Mitotic Arrest Deficient Like 1 | 204857_at | (D) DE/ 472.3% | 2 | 1.47E−02/ 4 Nominal | Gender/ Dx F-PSYCHOSIS C: (4/19) 0.78/4.45E−02 | All L: (14/236) 0.64/4.24E−02 Gender Male L: (14/208) 0.64/4.07E−02 | All L: (62/288) 1.8/1.32E−03 Gender Male L: (59/255) 1.7/2.66E−03 Gender/ Dx M-BP L: (24/91) 2.1/9.71E−03 M-MDD L: (4/32) 31.4/5.50E−03 | Autism BP Cocaine SZ | | 33 |
| OAS1 2′-5′-Oligo-adenylate Synthetase 1 | 202869_at | (D) DE/ 456.9% | 9 | 1.15E−01/ 2 Stepwise | All C: (38/258) 0.6/2.77E−02 Gender Female C: (13/60) 0.66/3.71E−02 Gender/ Dx F-PSYCHOSIS C: (4/19) 0.8/3.59E−02 | | Gender/ Dx M-PSYCHOSIS L: (29/121) 2.7/1.52E−02 M-SZ L: (8/56) 3.5/4.35E−02 | Alcohol Alzheimer's Panic Disorder MDD | Mood Stabilizers | 33 |

TABLE 2-continued

Convergent Functional Evidence (CFE) for Best Predictive Biomarkers for Stress (n = 41 genes, 42 probesets). After Step 4 Testing in independent cohorts for state and trait predictions. Telomere Length (TL) was chosen as a literature based positive control/comparator. FKBP5 is the gene with the most consistent evidence across all steps in our work, and a de facto positive control based on its extensive prior evidence in the field.

| Gene Symbol/ Gene Name | Probesets | Step 1 Discovery in Blood (Direction of Change) Method/ Score/% 6 pts | Step 2 External CFG Evidence For Involvement in Stress Score 12 pts | Step 3 Validation in Blood ANOVA p-value/ Score 6 pts | Step 4 Best Significant Prediction of Stress ROC AUC/ p-value 8 pts All 6 pts Gender 4 pts Gender/Dx | Step 4 Best Significant Prediction of First Year Hosp Visits with Stress ROC AUC/ p-value 8 pts All 6 pts Gender 4 pts Gender/Dx | Step 4 Best Significant Predictions of All Future Hosp visits with Stress OR/OR p-value 8 pts All 6 pts Gender 4 pts Gender/Dx | Step 5 Other Psychiatric and Related Disorders Evidence-Change in same direction as stress 3 pts | Step 6 Drugs that Modulate the Biomarker in Opposite Direction to Stress 3 pts | CFE Poly-evidence Score |
|---|---|---|---|---|---|---|---|---|---|---|
| OXA1L OXA1L, Mitochondrial Inner Membrane Protein | 2087 17_at | (D) DE/ 456.9% | 6 | 6.40E−03/ 4 Nominal | Gender/ Dx F-BP C: (6/22) 0.75/3.84E−02 | Gender/ Dx M-MDD L: (2/27) 0.86/4.78E−02 | All L: (62/288) 1.5/1.14E−02 Gender Male L: (59/255) 1.5/2.04E−02 Gender/ Dx F-PSYCHOSIS C: (6/17) 4.2/3.02E−02 M-MDD L: (4/32) 3.5/4.37E−02 M-SZ L: (8/56) 4.7/2.19E−02 | Autism BP Suicide SZ | | 33 |
| CCL4 C-C Motif Chemokine Ligand 4 | 2041 03_at | (D) DE/ 696.9% | 2 | Not Stepwise | Gender/ Dx F-PTSD C: (3/7) 1/1.69E−02 M-MDD C: (6/35) 0.75/2.99E−02 | All L: (14/234) 0.66/2.01E−02 Gender Male L: (14/206) 0.66/2.07E−02 Gender/ Dx M-MDD L: (2/27) 0.94/2.08E−02 | All L: (62/286) 1.4/3.22E−02 Gender Male L: (59/253) 1.6/1.01E−02 Gender/ Dx M-BP L (24/91) 2.2/5.34E−03 M-MDD L: (4/32) 54.5/2.12E−02 | Alcohol Depression MDD SZ | | 31 |
| DTNBP1 Dystrobrevin Binding Protein 1 | 2234 46_s_at | (D) DE/ 693.8% | 4 | Not Stepwise | Gender Female C: (13/60) 0.7/1.33E−02 Gender/ Dx F-PSYCHOSIS C: (4/19) 0.9/8.20E−03 F-SZA C: (3/13) 0.93/1.40E−02 | Gender/ Dx M-MDD C: (9/57) 3.1/2.45E−02 | All L. (62/286) 1.4/2.26E−02 Gender Male L. (59/253) 1.5/7.76E−03 Gender/ Dx M-BP L: (24/91) 1.9/2.78E−03 | Autism Intellect Methamphetamine Psychosis SZ BP MDD Suicide | | 31 |

TABLE 2-continued

Convergent Functional Evidence (CFE) for Best Predictive Biomarkers for Stress (n = 41 genes, 42 probesets). After Step 4 Testing in independent cohorts for state and trait predictions. Telomere Length (TL) was chosen as a literature based positive control/comparator. FKBP5 is the gene with the most consistent evidence across all steps in our work, and a de facto positive control based on its extensive prior evidence in the field.

| Gene Symbol/ Gene Name | Probe-sets | Step 1 Discovery in Blood (Direction of Change) Method/ Score/% 6 pts | Step 2 External CFG Evidence For Involve-ment in Stress Score 12 pts | Step 3 Validation in Blood ANOVA p-value/ Score 6 pts | Step 4 Best Significant Prediction of Stress ROC AUC/ p-value 8 pts All 6 pts Gender 4 pts Gender/Dx | Step 4 Best Significant Prediction of First Year Hosp Visits with Stress ROC AUC/ p-value 8 pts All 6 pts Gender 4 pts Gender/Dx | Step 4 Best Significant Predictions of All Future Hosp visits with Stress OR/OR p-value 8 pts All 6 pts Gender 4 pts Gender/Dx | Step 5 Other Psychiatric and Related Disorders Evidence-Change in same direction as stress 3 pts | Step 6 Drugs that Modulate the Biomarker in Opposite Direction to Stress 3 pts | CFE Poly-evi-dence Score |
|---|---|---|---|---|---|---|---|---|---|---|
| SPON2 Spondin 2 | 2186 38_s_ at | (D) DE/ 693.8% | 2 | Not Stepwise | Gender/ Dx F-PTSD C: (3/7) 1/1.69E−02 | All L: (14/234) 0.66/2.24E−02 Gender Male L; (14/206) 0.66/2.19E−02 Gender/ Dx M-BP L: (10/77) 0.67/4.20E−02 M-MDD C: (5/49) 0.83/8.70E−03 M-MDD L: (2/27) 0.88/3.93E−02 | M-SZA C: (39/108) 1.5/1.55E−02 All L: (62/286) 1.6/8.58E−03 Gender Male L: (59/253) 1.7/4.62E−03 Gender/ Dx M-BP L: (24/91) 4.4/9.90E−04 M-MDD L: (4/32) 14.6/1.88E−02 | Autism BP Panic Disorder SZ | | 31 |
| ANK2 Ankyrin 2 | 2029 21_s_ at | (I) DE 452.9% | 2 | 1.09E−02/ 4 Nominal | Gender Female C (13/60) 0.66/4.33E−02 F-BP C: (6/22) 0.75/3.84E−02 M-MDD C: (6/35) 0.72/4.81E−02 | Gender/ Dx M-MDD C: (5/49) 0.75/3.22E−02 M-MDD L: (2/27) 0.96/1.66E−02 | Gender/ Dx M-MDD L: (4/32) 76.8/8.14E−03 | Autism Alcohol BP Longevity ASD Chronic Fatigue Syndrome MDD Suicide SZ | Anti-depressants | 30 |
| LAIR2 Leukocyte Associated Immu-noglobulin Like Receptor 2 | 2075 09_s_ at | (D) DE/ 698.5% | 0 | Not Stepwise | Most reproducibly predictive for state All C: (38/258) 0.62/1.15E−02 Gender Female C: (13/60) 0.81/3.37E−04 Female L: (5/33) 0.81/1.36E−02 Gender/ | Gender Female C: (2/46) 0.97/1.36E−02 | Gender/ Dx M-BP L: (24/91) 2.6/7.13E−03 M-MDD L: (4/32) 5.5/4.21E−02 | Suicide | Anti-depressants | 30 |

TABLE 2-continued

Convergent Functional Evidence (CFE) for Best Predictive Biomarkers for Stress (n = 41 genes, 42 probesets). After Step 4 Testing in independent cohorts for state and trait predictions. Telomere Length (TL) was chosen as a literature based positive control/comparator. FKBP5 is the gene with the most consistent evidence across all steps in our work, and a de facto positive control based on its extensive prior evidence in the field.

| Gene Symbol/ Gene Name | Probe-sets | Step 1 Discovery in Blood (Direction of Change) Method/ Score/% 6 pts | Step 2 External CFG Evidence For Involvement in Stress Score 12 pts | Step 3 Validation in Blood ANOVA p-value/ Score 6 pts | Step 4 Best Significant Prediction of Stress ROC AUC/ p-value 8 pts All 6 pts Gender 4 pts Gender/Dx | Step 4 Best Significant Prediction of First Year Hosp Visits with Stress ROC AUC/ p-value 8 pts All 6 pts Gender 4 pts Gender/Dx | Step 4 Best Significant Predictions of All Future Hosp visits with Stress OR/OR p-value 8 pts All 6 pts Gender 4 pts Gender/Dx | Step 5 Other Psychiatric and Related Disorders Evidence- Change in same direction as stress 3 pts | Step 6 Drugs that Modulate the Biomarker in Opposite Direction to Stress 3 pts | CFE Poly-evi-dence Score |
|---|---|---|---|---|---|---|---|---|---|---|
| | | | | | Dx F-BP C: (6/22) 0.86/4.94E−03 F-BP L: (2/12) 1/1.58E−02 F-PTSD C: (3/7) 1/1.69E−02 M-MDD C: (6/35) 0.76/2.44E−02 | | | | | |
| SUMO 1 Small Ubiquitin-Like Modifier 1 | 2087 62_at | (D) DE/ 456.3% | 9 | Not Stepwise | Gender Female C: (13/60) 0.70/1.46E−02 Gender/ Dx F-BP C: (6/22) 0.75/3.84-02 L: (2/12) 0.9/4.28-02 | Gender/ Dx M-SZ C: (3/74) 0.87/1.57-02 L: (1/44) 1/4.52-02 | Gender/ Dx M-SZ C: (13/93) 2.98/2.98-02 L: (8/56) 3.26/3.07-02 | Aging BP | SZ | 30 |
| *MKL2* MKL1/ Myocardin Like 2 | 1562 497_ at | (I) AP/4 60.8% | 2 | 4.58E−02/ 4 Nominal | Most reproducibly predictive for trait first year All C: (32/398) 0.59/3.79E−02 Gender Male C: (30/352) 0.61/2.53E−02 Male L: (14/206) 0.64/4.33E−02 Gender/ Dx M-BP L: (10/77) 0.67/3.81E−02 M-MDD L: (2/27) 0.88/3.93E−02 M- | All C: (113/474) 1.2/7.86E−03 L: (62/286) 1.4/3.45E−03 Gender Male C: (106/421) 1.2/1.84E−02 Male L. (59/253) 1.3/7.90E−03 Gender/ Dx M-BP C: (41/140) 1.3/3.59E−03 M-BP L (24/91) 1.6/6.70E−04 M-MDD L: (4/32) 3.3/1.73E−02 | Autism SZ | | 29 |

TABLE 2-continued

Convergent Functional Evidence (CFE) for Best Predictive Biomarkers for Stress (n = 41 genes, 42 probesets). After Step 4 Testing in independent cohorts for state and trait predictions. Telomere Length (TL) was chosen as a literature based positive control/comparator. FKBP5 is the gene with the most consistent evidence across all steps in our work, and a de facto positive control based on its extensive prior evidence in the field.

| Gene Symbol/ Gene Name | Probe- sets | Step 1 Discovery in Blood (Direction of Change) Method/ Score/% 6 pts | Step 2 External CFG Evidence For Involve- ment in Stress Score 12 pts | Step 3 Validation in Blood ANOVA p-value/ Score 6 pts | Step 4 Best Significant Prediction of Stress ROC AUC/ p-value 8 pts All 6 pts Gender 4 pts Gender/Dx | Step 4 Best Significant Prediction of First Year Hosp Visits with Stress ROC AUC/ p-value 8 pts All 6 pts Gender 4 pts Gender/Dx | Step 4 Best Significant Predictions of All Future Hosp visits with Stress OR/OR p-value 8 pts All 6 pts Gender 4 pts Gender/Dx | Step 5 Other Psychiatric and Related Disorders Evidence- Change in same direction as stress 3 pts | Step 6 Drugs that Modulate the Biomarker in Opposite Direction to Stress 3 pts | CFE Poly- evi- dence Score |
|---|---|---|---|---|---|---|---|---|---|---|
| DMGDH Dimeth- ylglycine Dehydro- genase | 2315 91_at | (I) DE/ 245.6% | 4 | 3.36E−02/ 4 Nominal | Gender/ Dx F-BP C: (6/22) 0.77/2.76E−02 | Gender/ Dx M-SZ <u>L: (1/44) 1.0/4.52E−02</u> | Gender Male L: (59/255) 1.3/4.80E−02 Gender/ Dx M-BP L: (24/91) 1.6/2.89E−02 M- PSYCHOSIS C: (52/201) 1.3/1.69E−02 M-SZ C: (13/93) 1.4/2.67E−02 M-SZ L: (8/56) 2.8/1.52E−02 | PSYCHOSIS C: (8/161) 0.68/3.94E−02 Delusion Suicide | | 27 |
| N4BP2 L2 NEDD 4 Binding Protein 2 Like 2 | 2143 88_at | (I) DE/ 469.1% | 4 | 4.40E−02/ 4 Nominal | Gender/ Dx F-BP C: (6/22) 0.77/2.76E−02 F-BP L: (2/12) 0.95/2.66E−02 | Gender/ Dx M-BP <u>L: (10/77) 0.74/7.66E−03</u> M-SZ C: (3/74) 0.82/3.02E−02 | Gender/ Dx M-BP L (24/91) 1.5/1.13E−02 | BP MDD SZ Suicide | | 27 |
| PCDH B6 Protocad- herin Beta 6 | 2394 43_at | (I) DE/ 238.2% | 6 | 1.17E−02/ 4 Nominal | All C: (38/258) 0.61/1.31E−02 Gender Male <u>C: (25/198) 0.65/7.19E−03</u> Gender/ Dx M-BP C: (10/101) 0.67/4.20E−02 | | Gender/ Dx M- PSYCHOSIS L: (29/121) 1.5/1.51E−02 M-SZ L: (8/56) 1.8/1.98E−02 | Suicide | | 27 |

TABLE 2-continued

Convergent Functional Evidence (CFE) for Best Predictive Biomarkers for Stress (n = 41 genes, 42 probesets). After Step 4 Testing in independent cohorts for state and trait predictions. Telomere Length (TL) was chosen as a literature based positive control/comparator. FKBP5 is the gene with the most consistent evidence across all steps in our work, and a de facto positive control based on its extensive prior evidence in the field.

| Gene Symbol/ Gene Name | Probe-sets | Step 1 Discovery in Blood (Direction of Change) Method/ Score/% 6 pts | Step 2 External CFG Evidence For Involve-ment in Stress Score 12 pts | Step 3 Validation in Blood ANOVA p-value/ Score 6 pts | Step 4 Best Significant Prediction of Stress ROC AUC/ p-value 8 pts All 6 pts Gender 4 pts Gender/Dx | Step 4 Best Significant Prediction of First Year Hosp Visits with Stress ROC AUC/ p-value 8 pts All 6 pts Gender 4 pts Gender/Dx | Step 4 Best Significant Predictions of All Future Hosp visits with Stress OR/OR p-value 8 pts All 6 pts Gender 4 pts Gender/Dx | Step 5 Other Psychiatric and Related Disorders Evidence-Change in same direction 3 pts | Step 6 Drugs that Modulate the Biomarker in Opposite Direction to Stress 3 pts | CFE Poly-evi-dence Score |
|---|---|---|---|---|---|---|---|---|---|---|
| SNCA Synuclein Alpha | 2158 11_at | (D) AP/237.5% | 11 | Not Stepwise | Gender/ Dx M-PSYCHOSIS L: (2/24) 0.98/1.41E−02 M-SZ L: (2/15) 1/1.36E−02 | | Gender/ Dx M-SZA C: (39/108) 1.6/3.62E−02 | Alcohol Aggression Alzheimer's BP MDD Metham phetamine Parkinson Suicide SZ | Omega-3 fatty acids, Mood Stabilizers | 27 |
| GJB2 Gap Junction Protein Beta 2 | 2232 78_at | (I) DE/ 248.5% | 6 | 2.42E−02/ 4 Nominal | Gender/ Dx M-MDD C: (6/35) 0.82/7.12E−03 | | Gender/ Dx M-SZ L: (8/56) 2.2/2.37E−02 | MDD | Anti-psychotics | 26 |
| HIF1A Hypoxia Inducible Factor 1 Alpha Subunit | 2388 69_at | (I) DE/ 454.4% | 4 | 1.11E−02/ 4 Nominal | | | Most reproducibly predictive for trait all future All C: (113/474) 1.2/3.86E−02 L: (62/288) 1.5/1.28E−02 Gender Male C: (106/421) 1.2/1.42E−02 L: (59/255) 1.5/5.53E−03 Gender/ Dx M-BP L: (24/91) 1.5/3.84E−02 M-PSYCHOSIS C: (52/201) 1.3/1.91E−02 M-PSYCHOSIS L (29/121) 1.7/2.57E−02 M-SZ C: | Alcohol Autism BP MDD Longevity Pain SZ | EZN 2968 | 26 |

TABLE 2-continued

Convergent Functional Evidence (CFE) for Best Predictive Biomarkers for Stress (n = 41 genes, 42 probesets). After Step 4 Testing in independent cohorts for state and trait predictions. Telomere Length (TL) was chosen as a literature based positive control/comparator. FKBP5 is the gene with the most consistent evidence across all steps in our work, and a de facto positive control based on its extensive prior evidence in the field.

| Gene Symbol/ Gene Name | Probe-sets | Step 1 Discovery in Blood (Direction of Change) Method/ Score/% 6 pts | Step 2 External CFG Evidence For Involvement in Stress Score 12 pts | Step 3 Validation in Blood ANOVA p-value/ Score 6 pts | Step 4 Best Significant Prediction of Stress ROC AUC/ p-value 8 pts All 6 pts Gender 4 pts Gender/Dx | Step 4 Best Significant Prediction of First Year Hosp Visits with Stress ROC AUC/ p-value 8 pts All 6 pts Gender 4 pts Gender/Dx | Step 4 Best Significant Predictions of All Future Hosp visits with Stress OR/OR p-value 8 pts All 6 pts Gender 4 pts Gender/Dx | Step 5 Other Psychiatric and Related Disorders Evidence-Change in same direction as stress 3 pts | Step 6 Drugs that Modulate the Biomarker in Opposite Direction to Stress 3 pts | CFE Poly-evi-dence Score |
|---|---|---|---|---|---|---|---|---|---|---|
| PSD3 Pleckstrin And Sec7 Domain Containing 3 | 2186 13_at | (D) AP/6 100% | 2 | Not Stepwise | | Gender Female C: (2/46) 0.98/1.18E−02 | (13/93) 1.7/3.44E−02 M-SZ L: (8/56) 3.3/1.75E−02 Gender Female C: (7/53) 2.2/4.42E−02 | Autism Alcohol ASD BP SZ MDD Metham phetamine Chronic Fatigue Syndrome Suicide | Anti-psychotics | 26 |
| STX11 Syntaxin 11 | 2101 90_at | (D) DE 249.2% | 4.5 | 2.74E−02/ 4 Nominal | Gender/ Dx M-MDD C: (6/35) 0.74/3.64E−02 | Gender/ Dx M-MDD C: (5/49) 0.95/4.78E−04 | Gender/ Dx M-MDD C: (9/57) 3.1/2.45E−02 | | Anti-depres-sants, Mood Stabilizers | 25.5 |
| APOL3 Apoli-poprotein L3 | 2210 87_s_at | (D) AP/450% | 2 | 2.96E−02/ 4 Nominal | | All L: (14/234) 0.7/5.34E−03 Gender Male L: (14/206) 0.71/4.53E−03 Gender/ Dx M-MDD L: (2/27) 0.92/2.59E−02 | Gender/ Dx F-SZA C: (3/12) 8.1/4.33E−02 M-MDD L: (4/32) 9.6/2.59E−02 | ADHD Suicide SZ | | 25 |
| ELMO2 Engulf-ment And Cell Motility 2 | 2203 63_s_at | (D) DE/ 460.0% (D) AP/454.7% | 2 | 1.30E−02/ 4 Nominal | Gender/ Dx M-MDD C: (5/49) 0.78/2.20 E−02 M-MDD L: (2/27) 0.92/2.59E−02 | All L: (62/288) 1.44/3.31E−02 Gender Male L: (59/255) 1.39/4.91E−02 Gender/ Dx M-MDD C: (9/57) 3.86/8.54E−03 L: (4/32) 6.07/3.64E−02 F-PSYCHOSIS | | Suicide | | 25 |

TABLE 2-continued

Convergent Functional Evidence (CFE) for Best Predictive Biomarkers for Stress (n = 41 genes, 42 probesets). After Step 4 Testing in independent cohorts for state and trait predictions. Telomere Length (TL) was chosen as a literature based positive control/comparator. FKBP5 is the gene with the most consistent evidence across all steps in our work, and a de facto positive control based on its extensive prior evidence in the field.

| Gene Symbol/ Gene Name | Probe-sets | Step 1 Discovery in Blood (Direction of Change) Method/ Score/% 6 pts | Step 2 External CFG Evidence For Involve-ment in Stress Score 12 pts | Step 3 Validation in Blood ANOVA p-value/ Score 6 pts | Step 4 Best Significant Prediction of Stress ROC AUC/ p-value 8 pts All 6 pts Gender 4 pts Gender/Dx | Step 4 Best Significant Prediction of First Year Hosp Visits with Stress ROC AUC/ p-value 8 pts All 6 pts Gender 4 pts Gender/Dx | Step 4 Best Significant Predictions of All Future Hosp visits with Stress OR/OR p-value 8 pts All 6 pts Gender 4 pts Gender/Dx | Step 5 Other Psychiatric and Related Disorders Evidence-Change in same direction as stress 3 pts | Step 6 Drugs that Modulate the Biomarker in Opposite Direction to Stress 3 pts | CFE Poly-evi-dence Score |
|---|---|---|---|---|---|---|---|---|---|---|
| UBE2 E2 Ubiquitin Conjugating Enzyme E2 E2 | 2256 51_at | (D) DE/ 453.8% | 4 | | 4.41E−02/ 4 Nominal | Gender Female C: (13/60) 0.68/2.58E−02 F-BP C: (6/22) 0.76/3.27E−02 | L: (6/17) 2.36/4.48E−02 Gender/ Dx M-PSYCHOSIS C: (52/201) 1.4/5.21E−03 M-SZA C: (39/108) 1.6/2.83E−03 | Psychosis | | 25 |
| FKBP5 FK506 Binding Protein 5 | 2248 40_at | (D) DE/ 241.5% | 12 | | Not Stepwise | | Gender/ Dx M-SZ L: (8/56) 3.4/3.84E−02 | Alcohol Anxiety BP Depression MDD Pain Psychosis Unipolar Depression Suicide | Mood Stabilizers Psycho-therapy | 24 |
| HLA-DRB1 Major Histocom-patibility Complex, Class II, DR Beta 1 | 2093 12_x_at | (D) DE/ 241.5% | 4 | | 1.22E−02/ 4 Nominal | | All L: (62/286) 1.7/5.17E−03 Gender Male (59/253) 1.6/1.21E−02 Gender/ Dx F-PSYCHOSIS C: (6/17) 3.1/2.62E−02 F-SZA C: (3/12) 39.3/4.08E−02 M-SZA C: (39/108) 1.4/2.18E−02 M-SZA L: (21/65) 1.7/4.72E−02 | Alcohol BP Longevity Alzheimer's Disease SZ Pain Panic Disorder | apolizumab | 24 |

TABLE 2-continued

Convergent Functional Evidence (CFE) for Best Predictive Biomarkers for Stress (n = 41 genes, 42 probesets). After Step 4 Testing in independent cohorts for state and trait predictions. Telomere Length (TL) was chosen as a literature based positive control/comparator. FKBP5 is the gene with the most consistent evidence across all steps in our work, and a de facto positive control based on its extensive prior evidence in the field.

| Gene Symbol/ Gene Name | Probe- sets | Step 1 Discovery in Blood (Direction of Change) Method/ Score/% 6 pts | Step 2 External CFG Evidence For Involve- ment in Stress Score 12 pts | Step 3 Validation in Blood ANOVA p-value/ Score 6 pts | Step 4 Best Significant Prediction of Stress ROC AUC/ p-value 8 pts All 6 pts Gender 4 pts Gender/Dx | Step 4 Best Significant Prediction of First Year Hosp Visits with Stress ROC AUC/ p-value 8 pts All 6 pts Gender 4 pts Gender/Dx | Step 4 Best Significant Predictions of All Future Hosp visits with Stress OR/OR p-value 8 pts All 6 pts Gender 4 pts Gender/Dx | Step 5 Other Psychiatric and Related Disorders Evidence- Change in same direction as stress 3 pts | Step 6 Drugs that Modulate the Biomarker in Opposite Direction to Stress 3 pts | CFE Poly- evi- dence Score |
|---|---|---|---|---|---|---|---|---|---|---|
| LCP2 Lymphocyte Cytosolic Protein 2 | 2442 51_at | (D) DE/ 453.8% | 3 | 2.01E−02/ 4 Nominal | Gender Male C: (30/352) 0.61/2.19E−02 Gender/ Dx M-SZA C: (5/87) 0.85/4.09E−03 M- PSYCHOSIS C: (8/161) 0.78/3.90E−03 | | Gender/ Dx M-SZ C: (13/93) 1.46/4.14E−02 L: (8/56) 2.17/2.38E−02 | MDD | | 24 |
| LRRC 59 Leucine Rich Repeat Con- taining 59 | 2222 31_s_ at | (D) DE/ 461.5% | 2 | 3.15E−02/ 4 Nominal | | | All L: (62/286) 1.35/4.50E−02 Gender Male L: (59/253) 1.38/3.67E−02 Gender/ Dx F-SZA C: (3/12) 56.1/4.25E−02 | SZ | Valproate | 24 |
| *FOXK2* Forkhead Box K2 | 2206 96_at | (I) DE/ 458.8% (I) AP/472.5% | 2 | 1.52E−02/ 4 Nominal | Gender Female C: (13/60) 0.68/2.18E−02 Female L: (5/33) 0.88/3.89E−03 Gender/ Dx F-BP C: (6/22) 0.76/3.27E−02 F-BP L: (2/12) 1/1.58E−02 F-PTSD C: (3/7) 1/1.69E−02 | | Gender/ Dx M-SZ L: (8/56) 2.2/1.09E−02 | Alcohol Autism Delusions Hallucin- ations Suicide | | 23 |

TABLE 2-continued

Convergent Functional Evidence (CFE) for Best Predictive Biomarkers for Stress (n = 41 genes, 42 probesets). After Step 4 Testing in independent cohorts for state and trait predictions. Telomere Length (TL) was chosen as a literature based positive control/comparator. FKBP5 is the gene with the most consistent evidence across all steps in our work, and a de facto positive control based on its extensive prior evidence in the field.

| Gene Symbol/ Gene Name | Probe- sets | Step 1 Discovery in Blood (Direction of Change) 6 pts | Step 2 External CFG Evidence For Involve- ment in Stress Score/% Score 12 pts | Step 3 Validation in Blood ANOVA p-value/ Score 6 pts | Step 4 Best Significant Prediction of Stress ROC AUC/ p-value 8 pts All 6 pts Gender 4 pts Gender/Dx | Step 4 Best Significant Prediction of First Year Hosp Visits with Stress ROC AUC/ p-value 8 pts All 6 pts Gender 4 pts Gender/Dx | Step 4 Best Significant Predictions of All Future Hosp visits with Stress OR/OR p-value 8 pts All 6 pts Gender 4 pts Gender/Dx | Step 5 Other Psychiatric and Related Disorders Evidence- Change in same direction as stress 3 pts | Step 6 Drugs that Modulate the Biomarker in Opposite Direction to Stress 3 pts | CFE Poly- evi- dence Score |
|---|---|---|---|---|---|---|---|---|---|---|
| HLA-B Major Histo- compati- bility Complex, Class I, B | 2119 11_x_ at | (D) DE/ 452.3% | 3 | 4.85E-02/ 4 Nominal | | Gender/ Dx M-MDD C: (5/49) 0.85/4.99E-03 M-MDD L: (2/27) 1.0/1.03E-02 | All L: (62/288) 1.65/4.74E-03 Gender Male L: (59/255) 1.66/4.25E-03 Gender/ Dx M-MDD L: (4/32) 5.35/1.09E-02 M-BP L. (24/91) 1.76/1.10E-02 | | | 23 |
| *NKTR* Natural Killer Cell Triggering Receptor | 2430 55_at | (I) DE/ 450% (I) AP/243.1% | 4 | 1.24E-02/ 4 Nominal | | | All C: (113/474) 1.4/9.52E-05** Gender Male C: (106/421) 1.4/1.43E-04** Gender/ Dx M-BP C: (41/140) 1.6/5.56E-05** M- PSYCHOSIS C: (52/201) 1.3/1.06E-02 M-SZ C: (13/93) 1.7/5.58E-03 M-SZ L: (8/56) 1.7/4.98E-02 | Alcohol BP MDD Suicide SZ | | 23 |

TABLE 2-continued

Convergent Functional Evidence (CFE) for Best Predictive Biomarkers for Stress (n = 41 genes, 42 probesets). After Step 4 Testing in independent cohorts for state and trait predictions. Telomere Length (TL) was chosen as a literature based positive control/comparator. FKBP5 is the gene with the most consistent evidence across all steps in our work, and a de facto positive control based on its extensive prior evidence in the field.

| Gene Symbol/ Gene Name | Probe-sets | Step 1 Discovery in Blood (Direction of Change) Method/ Score/% 6 pts | Step 2 External CFG Evidence For Involvement in Stress Score 12 pts | Step 3 Validation in Blood ANOVA p-value/ Score 6 pts | Step 4 Best Significant Prediction of Stress ROC AUC/ p-value 8 pts All 6 pts Gender 4 pts Gender/Dx | Step 4 Best Significant Prediction of First Year Hosp Visits with Stress ROC AUC/ p-value 8 pts All 6 pts Gender 4 pts Gender/Dx | Step 4 Best Significant Predictions of All Future Hosp visits with Stress OR/OR p-value 8 pts All 6 pts Gender 4 pts Gender/Dx | Step 5 Other Psychiatric and Related Disorders Evidence-Change in same direction as stress 3 pts | Step 6 Drugs that Modulate the Biomarker in Opposite Direction to Stress 3 pts | CFE Poly-evi-dence Score |
|---|---|---|---|---|---|---|---|---|---|---|
| *PLEKH A5* Pleckstrin Homology Domain Containing A5 | 2395 59_at | (I) DE/ 235.3% | 4 | 3.33E–02/ 4 Nominal | | Gender/ Dx M-SZ C: (3/74) 0.91/8.24E–03 Gender/ Dx M-BP L: (24/91) 1.6/1.15E–02 | Gender Male C. (106/421) 1.2/4.50E–02 | BP | Suicide | 23 |
| C1orf123 Chromo-some 1 Open Reading Frame 123 | 2031 97_s_at | (D) DE/ 472.3% | 2 | 2.92E–02/ 4 Nominal | | All L: (62/288) 1.5/1.44E–02 Gender Female L: (3/33) 12.3/3.35E–02 Gender Male L. (59/255) 1.3/4.43E–02 F-PSYCHOSIS C: (6/17) 3.5/2.00E–02 M-MDD L: (4/32) 3/3.73E–02 | | | Suicide | 21 |
| UQCC 1 Ubiquinol-Cyto-chrome C Reductase Complex Assembly Factor 1 | 2179 35_s_at | (D) DE/ 238.5% | 4 | 3.33E–02/ 4 Nominal | Gender/ Dx M-BP C: (10/101) 0.72/1.18E–02 | Gender/ Dx M-SZ C: (3/74) 0.89/1.19E–02 | | BP | Suicide | 21 |
| *PCBP2* Poly(R C) Binding Protein 2 | 2373 74_at | (I) DE/ 235.3% | 4.5 | 2.83E–02/ 4 Nominal | Gender/ Dx F-BP C: (6/22) 0.89/3.19-03 L: (2/12) 1/1.58-02 M-SZ C: (4/29) 0.8/2.89-02 | | | BP | Suicide | 17.5 |

TABLE 2-continued

Convergent Functional Evidence (CFE) for Best Predictive Biomarkers for Stress (n = 41 genes, 42 probesets). After Step 4 Testing in independent cohorts for state and trait predictions. Telomere Length (TL) was chosen as a literature based positive control/comparator. FKBP5 is the gene with the most consistent evidence across all steps in our work, and a de facto positive control based on its extensive prior evidence in the field.

| Gene Symbol/ Gene Name | Probe-sets | Step 1 Discovery in Blood (Direction of Change) Method/ Score/% 6 pts | Step 2 External CFG Evidence For Involvement in Stress Score 12 pts | Step 3 Validation in Blood ANOVA p-value/ Score 6 pts | Step 4 Best Significant Prediction of Stress ROC AUC/ p-value 8 pts All 6 pts Gender 4 pts Gender/Dx | Step 4 Best Significant Prediction of First Year Hosp Visits with Stress ROC AUC/ p-value 8 pts All 6 pts Gender 4 pts Gender/Dx | Step 4 Best Significant Predictions of All Future Hosp visits with Stress OR/OR p-value 8 pts All 6 pts Gender 4 pts Gender/Dx | Step 5 Other Psychiatric and Related Disorders Evidence- Change in same direction as stress 3 pts | Step 6 Drugs that Modulate the Biomarker in Opposite Direction to Stress 3 pts | CFE Poly-evi-dence Score |
|---|---|---|---|---|---|---|---|---|---|---|
| DCTN 5 Dynactin Subunit 5 | 2092 31_s_ at | (D) DE/ 690.8% | 2 | Not Stepwise | | | Gender/ Dx F-PSYCHOSIS C: (6/17) 3.3/3.22E−02 M-SZ <u>L: (8/56) 6.5/4.80E−03</u> | BP Suicide | | 15 |
| LOC10 5378349 Uncha-racterized LOC10 5378349 | 2411 43_at | (D) AP/6 90.6% | 0 | Not Stepwise | Gender/ Dx M-<u>PSYCHOSIS C: (5/47) 0.74/4.22E−02</u> | | Gender/ Dx M-BP C: (41/140) 1.4/2.00E−02 M-MDD C: (9/57) 2.4/2.68E−02 | | | 14 |

Figure 2A:
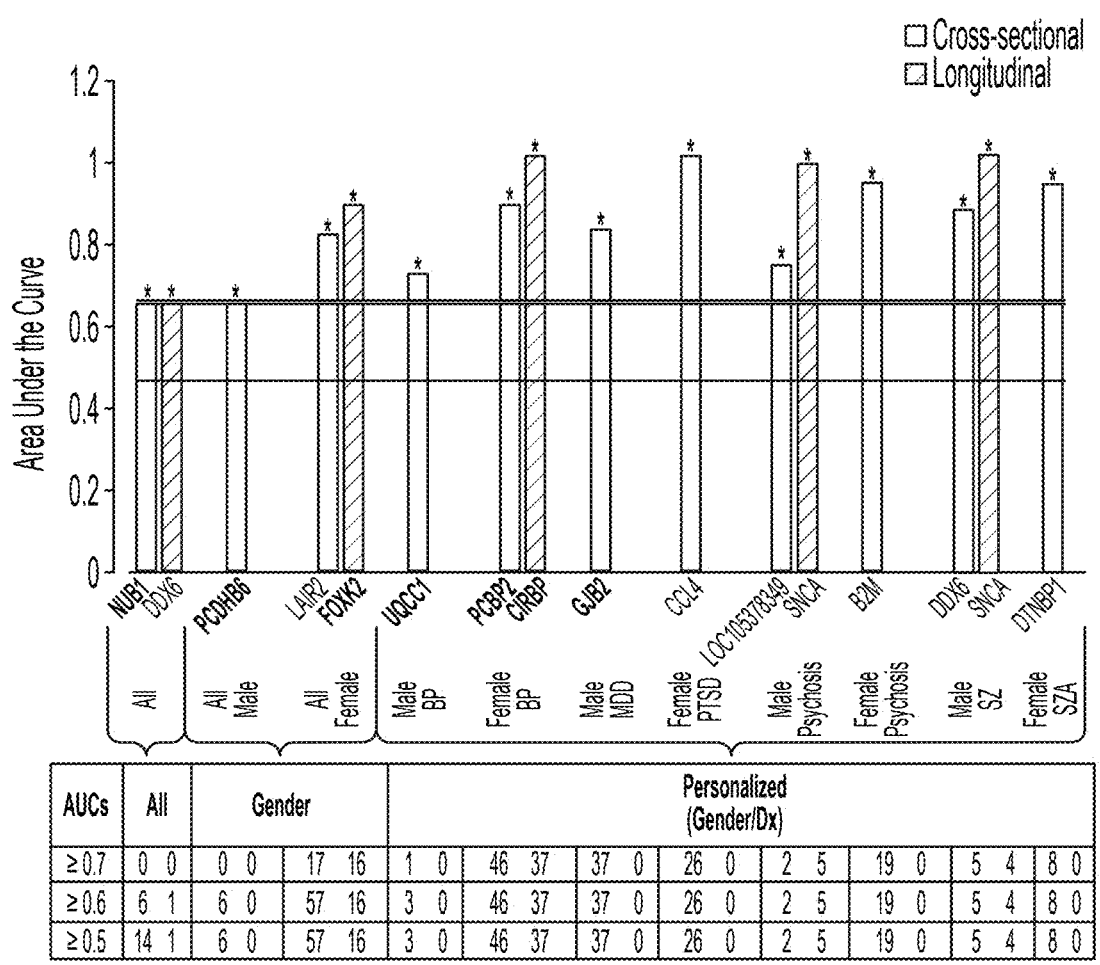
FIGS. 2A-2C depict best biomarker predictors for stress from top candidate biomarkers that survived Steps 1-3 (Discovery, Prioritization, Validation-Bold) (n=285). Bar graph shows best predictive biomarkers in each group. * Nominally significant for predictions p<0.05. ** Bonferroni significant for the 285 biomarkers tested. Table underneath each graph displays the actual number of biomarkers for each group whose ROC AUC p-values (FIGS. 2A and 2B) and Cox Odds Ratio p-values (FIG. 2C) were at least nominally significant. Some gender and diagnosis groups were left off the graph as they did not have any significant biomarkers. Cross-sectional analysis was based on levels at one visit. Longitudinal analysis was based on levels at multiple visits (integrates levels at most recent visit, maximum levels, slope into most recent visit, and maximum slope). Dividing lines represent the cutoffs for a test performing at chance levels (white), and at the same level as the best biomarkers for all subjects in cross-sectional (gray) and longitudinal (black) based predictions. All biomarkers performed better than chance. Biomarkers also performed better when personalized by gender and diagnosis.
Figure 2B:
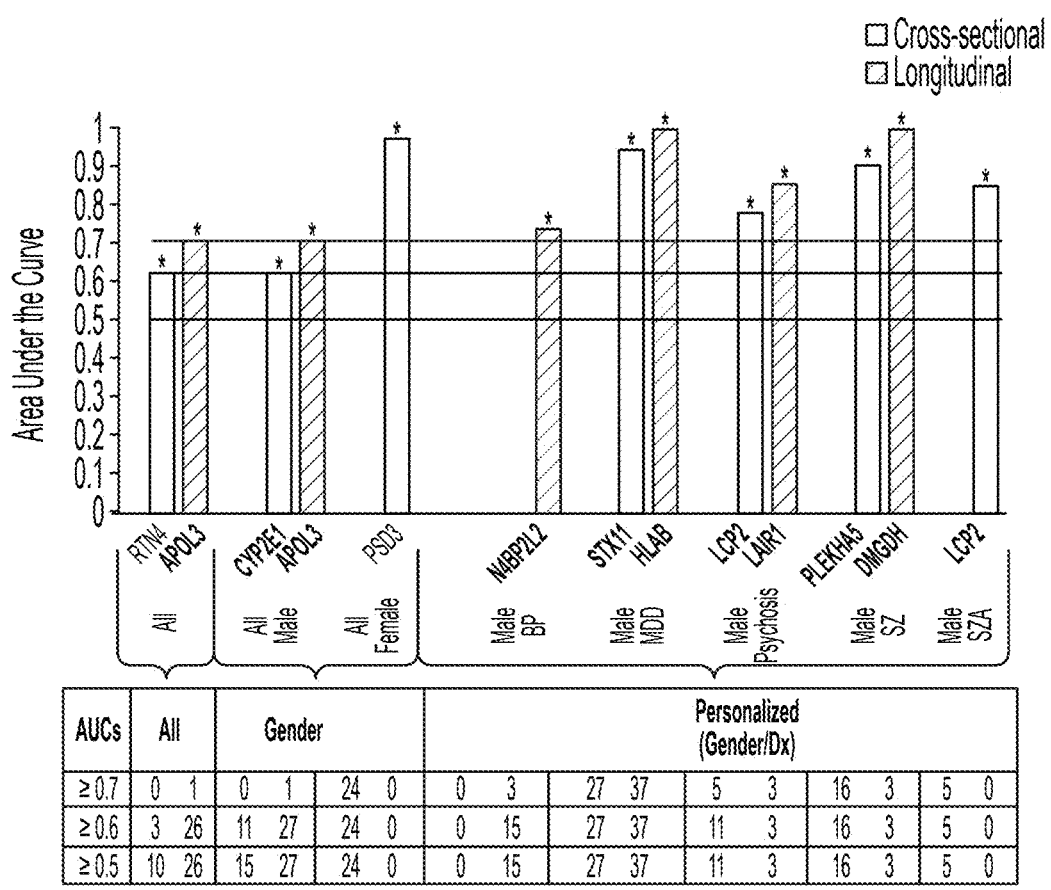
Figure 2C:
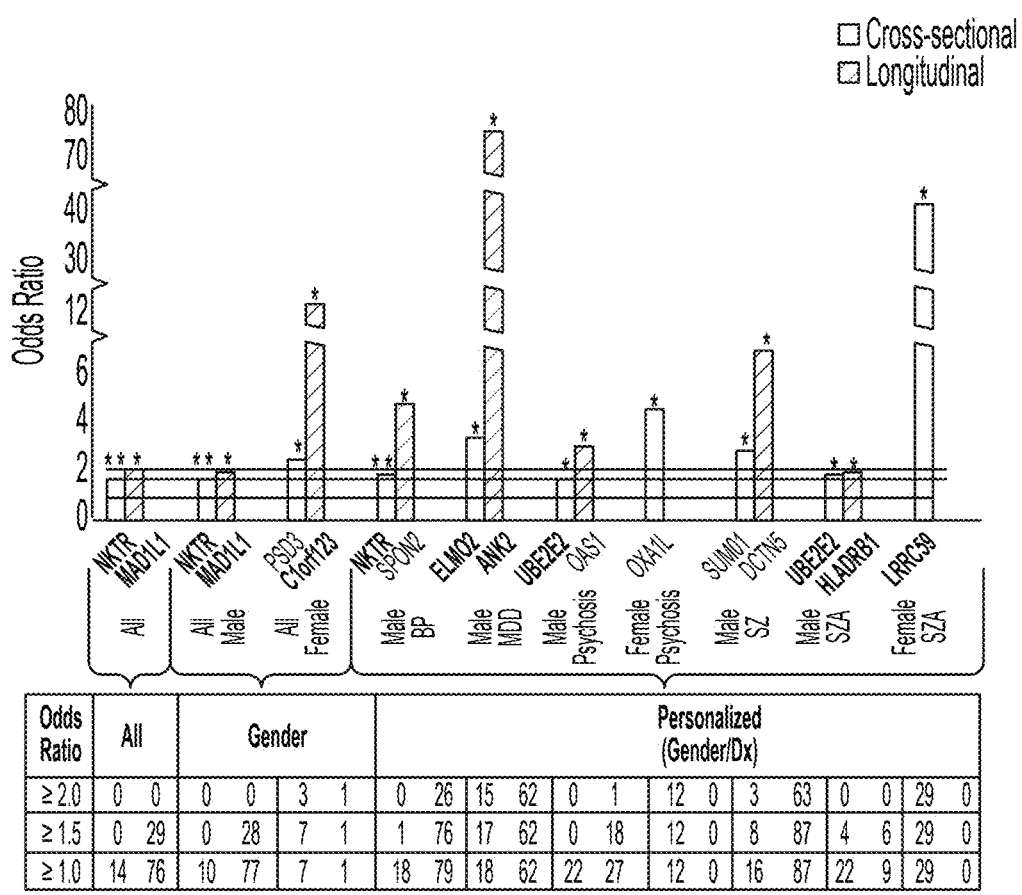

Bold-indicates biomarker decreased in expression,
Italic-indicates biomarker increased in expression. DE-differential expression,
AP-Absent/Present.
NS-Non-stepwise in validation.
Bold name genes also nominally significant at Step 3 validation (n = 29).
For Step 4 Predictions, C-cross-sectional (using levels from one visit), L-longitudinal (using levels and slopes from multiple visits).
In All, by Gender, and personalized by Gender and Diagnosis (Gender/Dx) M-males, F-Females, MDD-depression, BP-bipolar, SZ-schizophrenia, SZA-schizoaffective, PSYCHOSIS-schizophrenia and schizoaffective combined, PTSD-post-traumatic stress disorder.
**significant after Bonferroni correction for number of biomarkers tested for predictive ability.
Underlined-best predictor category as depicted in FIGS. 2A-2C Blood Gene Expression Experiments RNA extraction. Whole blood (2.5 ml) was collected into each PaxGene tube by routine venipuncture. PaxGene tubes contain proprietary reagents for the stabilization of RNA. RNA was extracted and processed as described in Le-Niculescu H. et al. Discovery and validation of blood biomarkers for suicidality. Mol Psychiatry 2013; 18 (12): 1249-1264; Niculescu A B, et al. Understanding and predicting suicidality using a combined genomic and clinical risk assessment approach. Mol Psychiatry 2015; 20 (11): 1266-1285; and Levey D F, et al. Towards understanding and predicting suicidality in women: biomarkers and clinical risk assessment. Molecular psychiatry 2016; 21 (6): 768-785.

Microarrays. Microarray work was carried out using previously described methodology (see, Le-Niculescu H. et al., Mol Psychiatry 2013; 18 (12): 1249-1264; Niculescu A B, et al., Mol Psychiatry 2015; 20 (11): 1266-1285; Levey D F, et al., Molecular psychiatry 2016; 21 (6): 768-785; and Niculescu A B et al. Precision medicine for suicidality: from universality to subtypes and personalization. Mol Psychiatry 2017; 22 (9): 1250-1273).

Telomere Length

Blood was collected in EDTA blood tubes and kept at −80° C. until time of extraction. DNA was extracted using the DNeasy Blood & Tissue Kit (Qiagen) and DNA concentration was assessed using Qubit (ThermoFisher Scientific) as per the manufacturer's protocols. Telomere length (TL) was determined using a relative quantitative real-time PCR (qRT-PCR) method (Mamdani et al. Variable telomere length across post-mortem human brain regions and specific reduction in the hippocampus of major depressive disorder. Transl Psychiatry 2015; 5: e636). Two assays were carried out, one for the Human albumin gene (ALB), which is a single copy gene, and the other assay with primers specific to the repetitive telomeric (TEL) sequence. The primers used to amplify the single copy gene are: ALBF (CTG TCA TCT CTT GTG GGC TGT) (SEQ ID NO:1) and ALBR (GGC ATG ACA GGT TTT GCA ATA) (SEQ ID NO:2) and those for the telomeric sequence are: TEL1b (CGG TTT GTT TGG GTT TGG GTT TGG GTT TGG GTT) (SEQ ID NO:3) and TEL2b (GGC TTG CCT TAC CCT TAC CCT TAC CCT TAC CCT TAC CCT) (SEQ ID NO:4). A ratio of the relative quantities (TEL/ALB) was used as a quantitative measure of TL. Each sample was run in triplicate and an average of the cycle thresholds was used to calculate telomere/single copy gene (T/S) ratios.

Biomarkers

Step 1: Discovery

The participant's score from a visual-analog scale Life Stress, assessed at the time of blood collection (FIG. 1B), was used. Gene expression differences were analyzed between visits with Low Stress (defined as a score of 0-33) and visits with High Stress (defined as a score of 67-100), using a powerful within-participant design, then an across-participants summation (FIGS. 1A-1G).

The data was analyzed in two ways: an Absent-Present (AP) approach, and a differential expression (DE) approach. The AP approach may capture turning on and off of genes, and the DE approach may capture gradual changes in expression. Analyses were performed as described in Niculescu A B, et al., Mol Psychiatry 2015; 20 (11): 1266-1285; Levey D F, et al., Molecular psychiatry 2016; 21 (6): 768-785; and Niculescu A B et al. Mol Psychiatry 2017; 22 (9): 1250-1273.

Figure 1C:
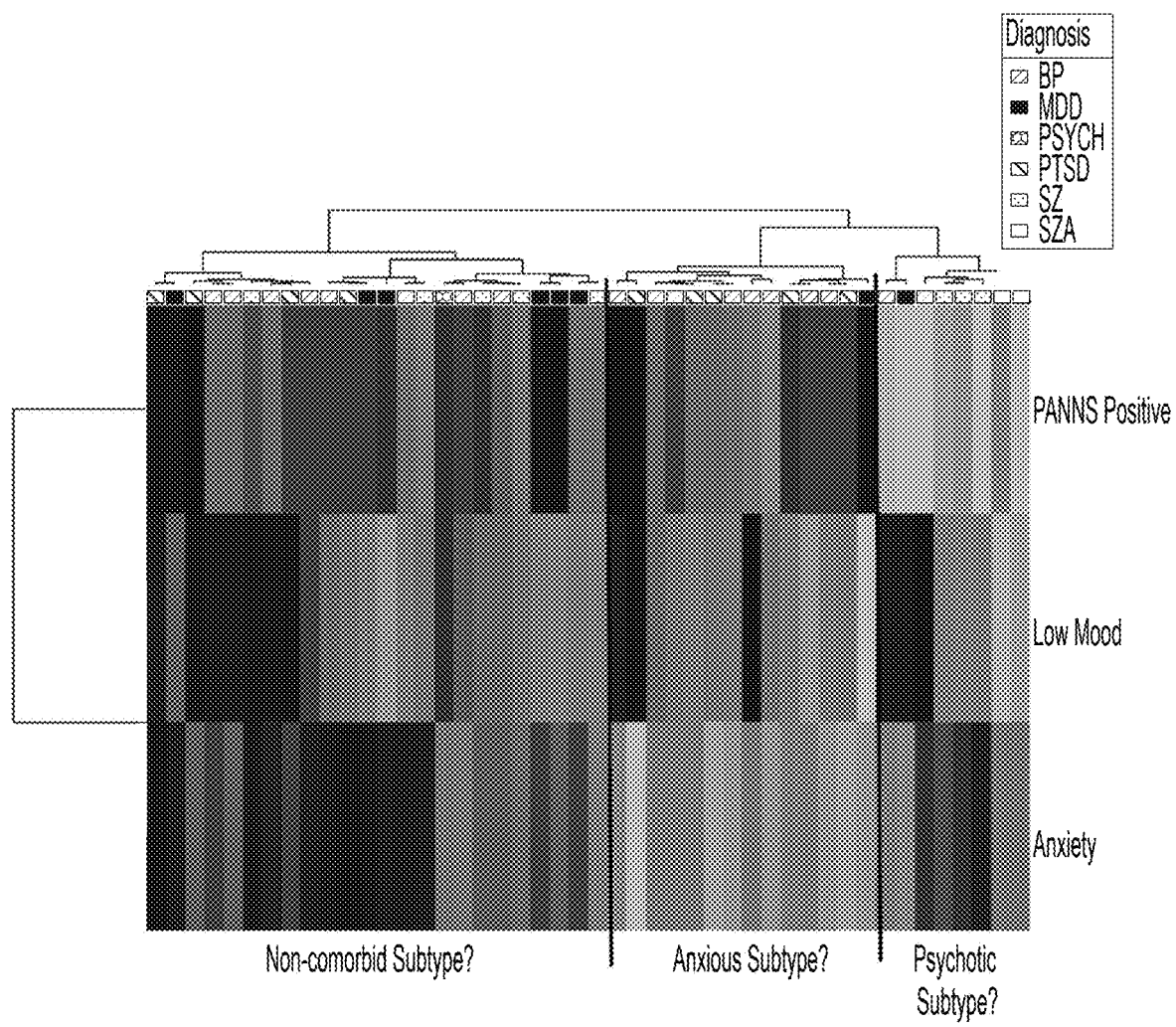
FIG. 1C depicts the discovery of possible subtypes of stress based on High Stress visits in the discovery cohort. Participants were clustered using measures of mood and anxiety (from Simplified Affective State Scale (SASS)), as well as psychosis (PANNS Positive).
Figure 1D:
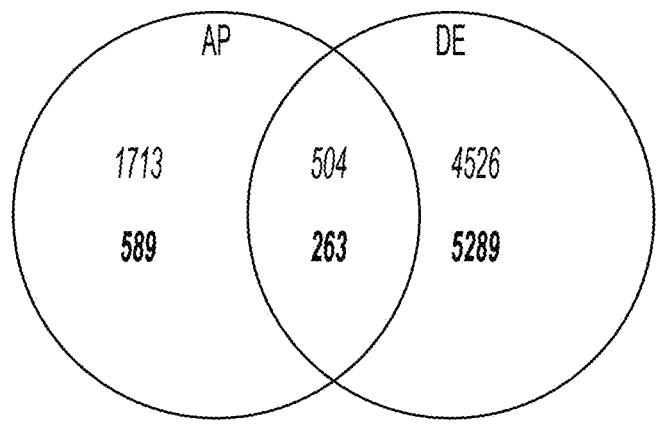
FIG. 1D depicts differential gene expression in the Discovery cohort-number of genes identified with differential expression (DE) and absent-present (AP) methods with an internal score of 2 and above. Numbers on the top represent biomarkers that were increased in expression in High Stress; numbers on the bottom represent biomarkers that were decreased in expression in High Stress. At the discovery step probesets were identified based on their score for tracking stress with a maximum of internal points of 6 (33% (2 pt), 50% (4 pt) and 80% (6 pt)).
Figure 1E:
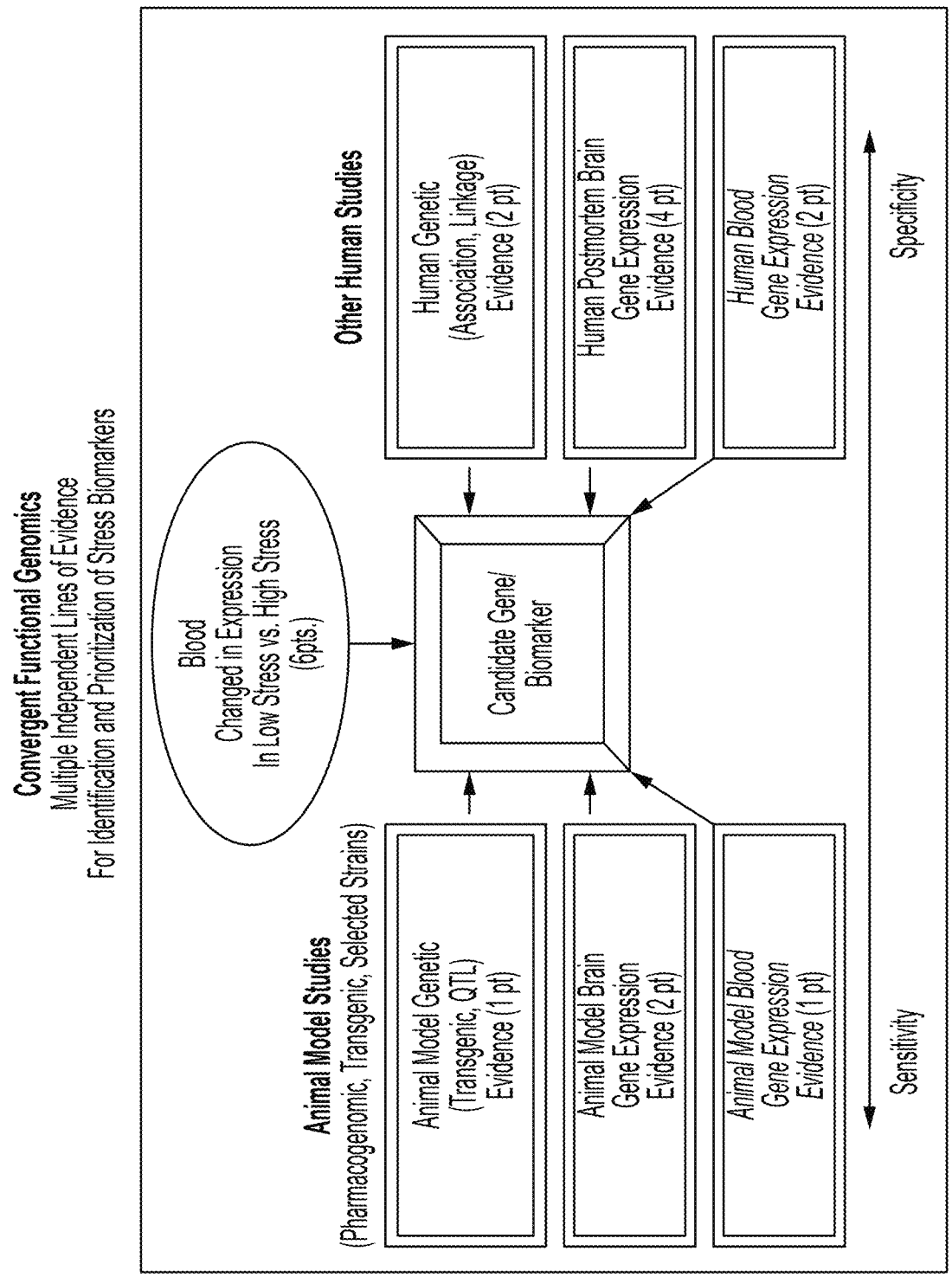
FIG. 1E shows prioritization with CFG for prior evidence of involvement in stress. In the prioritization step, probesets were converted to their associated genes using Affymetrix annotation and GeneCards. Genes were prioritized and scored using CFG for stress evidence with a maximum of 12 external points. Genes scoring at least 6 points out of a maximum possible of 18 total internal and external scores points were carried to the validation step.

Gene Symbol for the probesets were identified using NetAffyx (Affymetrix) for Affymetrix HG-U133 Plus 2.0 GeneChips, followed by GeneCards to confirm the primary gene symbol. In addition, for those probesets that were not assigned a gene symbol by NetAffyx, was used GeneAnnot (https://genecards.weizmann.ac.il/geneannot/index.shtml) to obtain gene symbol for these uncharacterized probesets, followed by GeneCard. Genes were then scored using a manually curated CFG databases as described below (FIG. 1E).

Step 2: Prioritization Using Convergent Functional Genomics (CFG)

Databases. Manually curated databases were established of the human gene expression/protein expression studies (postmortem brain, peripheral tissue/fluids: CSF, blood and cell cultures), human genetic studies (association, copy number variations and linkage), and animal model gene expression and genetic studies, published to date on psychiatric disorders. Only findings deemed significant in the primary publication, by the study authors, using their particular experimental design and thresholds, are included in the databases. The databases include only primary literature data and do not include review papers or other secondary data integration analyses to avoid redundancy and circularity. These large and constantly updated databases have been used in the CFG cross validation and prioritization platform (FIG. 1E). For this Example, data from 354 papers on stress were present in the databases at the time of the CFG analyses (February 2018) (human genetic studies-93, human brain studies-10, human peripheral tissue/fluids-96, non-human genetic studies-17, non-human brain studies-123, non-human peripheral tissue/fluids-17). Analyses were performed as previously described in Niculescu A B, et al., Mol Psychiatry 2015; 20 (11): 1266-1285; Levey D F, et al., Molecular psychiatry 2016; 21 (6): 768-785.

Step 3: Validation Analyses

Which of the top candidate genes (total CFG score of 6 or above), were stepwise changed in expression from the Low Stress and High Stress group to the Validation Clinically Severe Stress group, were examined. A CFG score of 6 or above reflects an empirical cutoff of 33.3% of the maximum possible total CFG score of 18, which permits the inclusion of potentially novel genes with maximal internal score of 6 but no external evidence score. Participants with Low Stress, as well as participants with High Stress from the discovery cohort, who did not have severe clinical stress (PCL-C<50) were used, along with the independent Validation cohort (n=48).

Figure 1F:
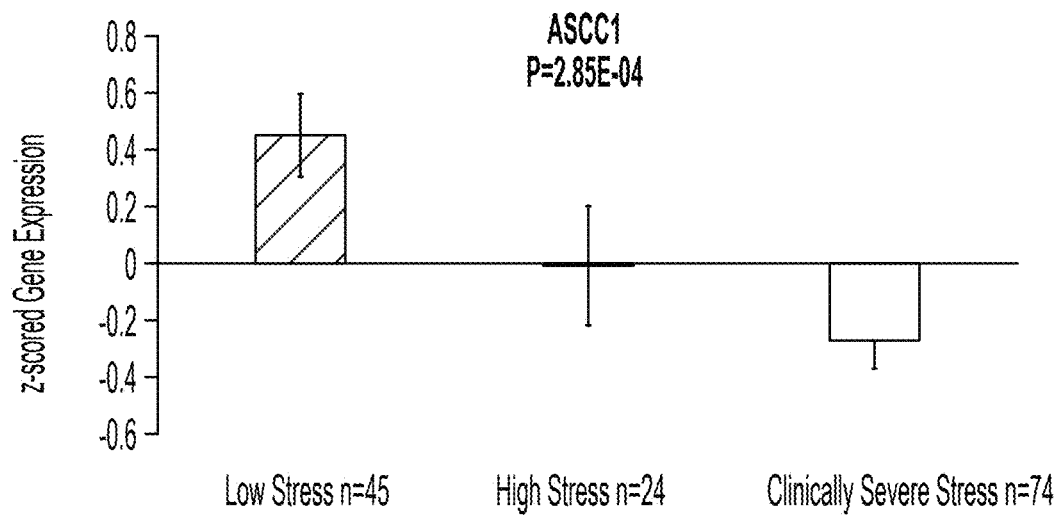
FIGS. 1F and 1G show validation in an independent cohort of psychiatric patients with clinically severe trait stress and high state stress. In the validation step, biomarkers were assessed for stepwise change from the discovery groups of participants with Low Stress, to High Stress, to Clinically Severe Stress, using ANOVA. N=number of testing visits. 232 biomarkers were nominally significant, ASCC1 (FIG. 1F) and NUB1 (FIG. 1G) were the most significant biomarkers, and 1130 biomarkers were stepwise changed.
Figure 1G:
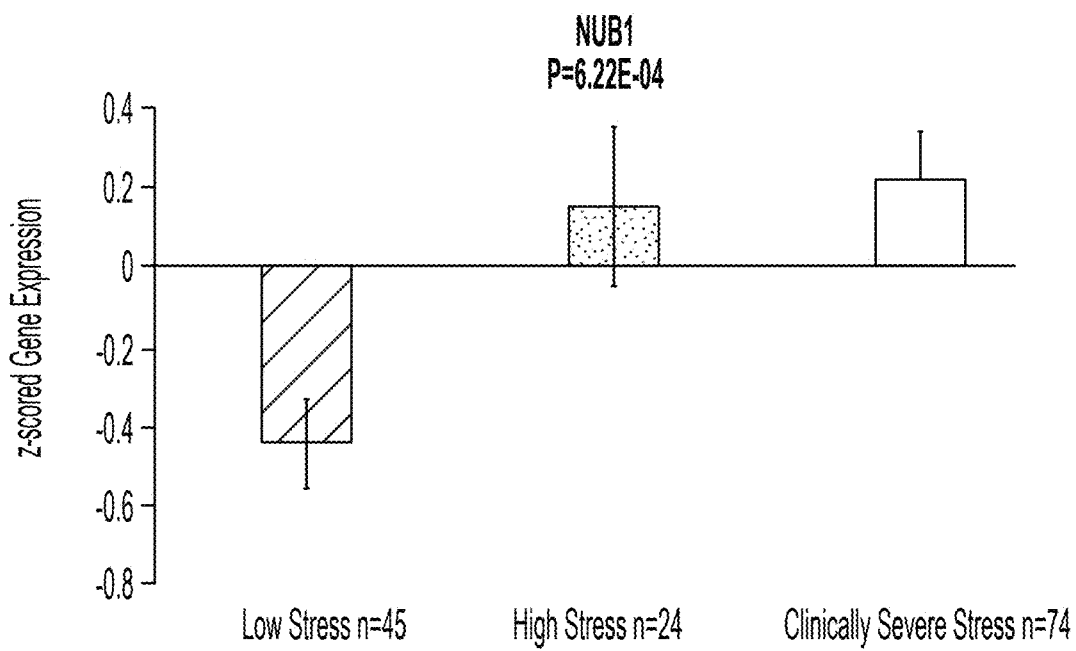
Figure 1G:
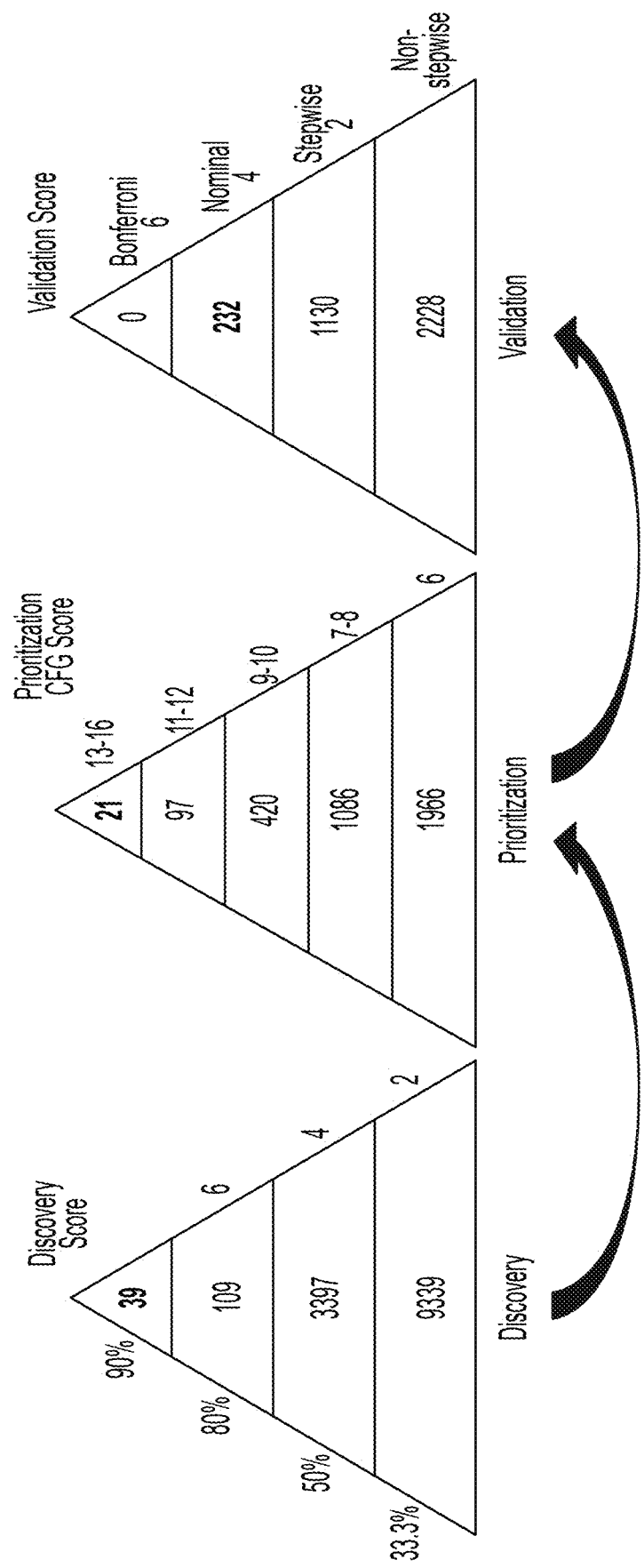

The AP derived and DE derived lists of genes were combined, and the gene expression data corresponding to them was used for the validation analysis. The cohorts (Validation Clinically Severe Stress, alongside the Low Stress and High Stress groups in the Discovery cohort) were assembled out of Affymetrix.cel data that was RMA normalized by gender and diagnosis. The log transformed expression data was transferred to an Excel sheet, and non-log transformed the data by taking 2 to the power of the transformed expression value. The values were then Z-scored by gender and diagnosis. The Excel sheets were imported with the Z-scored by gender and diagnosis expression data into Partek, and statistical analyses were performed using a one-way ANOVA for the stepwise changed probesets, and stringent Bonferroni corrections was also attempted for all the probesets tested (stepwise and non-stepwise) (FIG. 1F). An R script that automatically analyzes the data directly from the Excel sheet was used to confirm our calculations.

Choice of Biomarkers to be Carried Forward

Top biomarkers from each step were then carried into testing. The list of candidate biomarkers included the top biomarkers from discovery step (≥90% of raw scores, n=39), the top biomarkers from the prioritization step (CFG score≥13, n=21), and the nominally significant biomarkers after the validation step (n=232), for a total of n=285 probesets (n=269 genes). The biomarkers and trait future hospitalizations with stress in the first year of follow-up, and in all future years of follow-up, were predicted from the list in independent cohorts state (High Life Stress VAS≥67).

Diagnostics

In Step 4, testing, the test cohort for predicting High Stress (state), and the test cohort for predicting future hospitalizations with stress (trait), were assembled out of data that was RMA normalized by gender and diagnosis. The cohort was completely independent from the discovery and validation cohorts, there was no participant overlap with them. Phenomic (clinical) and gene expression markers used for predictions were Z scored by gender and diagnosis, to be able to combine different markers into panels and to avoid potential artefacts due to different ranges of expression in different gender and diagnoses. Markers were combined by simple summation of the increased risk markers minus the decreased risk markers. Predictions were performed using R-studio. For cross-sectional analyses, marker expression levels, z-scored by gender and diagnosis, were used. For longitudinal analyses, four measures were combined: marker expression levels, slope (defined as ratio of levels at current testing visit vs. previous visit, divided by time between visits), maximum levels (at any of the current or past visits), and maximum slope (between any adjacent current or past visits). For decreased markers, the minimum rather than the maximum was used for level calculations. All four measures were Z-scored, then combined in an additive fashion into a single measure. The longitudinal analysis was carried out in a sub-cohort of the testing cohort consisting of participants that had at least two test visits.

Predicting State High Stress. Receiver-operating characteristic (ROC) analyses between marker levels and stress state were performed by assigning participants visits with a Life Stress VAS score of ≥67 into the High Stress category. The pROC package of R (Xavier Robin et al. BMC Bioinformatics 2011) was used (Table 2, FIGS. 2A-2C). Additionally, a one-tailed t-test was performed between High Stress group vs. the rest, and Pearson R (one-tail) was calculated between Life Stress VAS scores and marker levels (data not shown).

Predicting Trait Future Hospitalization with Stress as a Symptom/Reason for Admission. Analyses were conducted for predicting future psychiatric hospitalizations with stress as a symptom/reason for admission in the first year following each testing visit, in participants that had at least one year of follow-up in the Veteran's Administration (VA) system. ROC analyses between genomic and phenomic markers measures (cross-sectional, longitudinal) at a specific testing visit and future hospitalization were performed as described above, based on assigning if participants had been admitted to the hospital due to stress or not. Additionally, a one tailed t-test with unequal variance was performed between groups of participant visits with and without future hospitalization with stress. Pearson R (one-tail) correlation was performed between hospitalization frequency (number of hospitalizations with stress divided by duration of follow-up) and marker levels. A Cox regression was performed using the time in days from the testing visit date to first hospitalization date in the case of patients who had been hospitalized, or 365 days for those who did not. The hazard ratio was calculated such that a value greater than 1 always indicates increased risk for hospitalization, regardless if the biomarker is increased or decreased in expression.

Pearson R and Cox regression analyses were also conducted for all future hospitalizations with stress, including those occurring beyond one year of follow-up, in the years following testing (on average 5.76 years per participant, range 0.07 to 11.27 years: see Supplementary Information 2), as these calculations, unlike the ROC and t-test, account for the actual length of follow-up, which varied from participant to participant. The ROC and t-test might in fact, if used, under-represent the power of the markers to predict, as the more severe psychiatric patients are more likely to move geographically and/or be lost to follow-up. The Cox regression was performed using the time in days from visit date to first hospitalization date in the case of patients who had hospitalizations with stress, or from visit date to last note date in the electronic medical records for those who did not.

Biological Understanding
Pathway Analyses

IPA (Ingenuity Pathway Analysis, version 24390178, Qiagen), David Functional Annotation Bioinformatics Microarray Analysis (National Institute of Allergy and Infectious Diseases) version 6.7 (August 2016), and Kyoto Encyclopedia of Genes and Genomes (KEGG) (through DAVID) were used to analyze the biological roles, including top canonical pathways and diseases (Table 3), of the candidate genes resulting from this work. The pathway analyses were run for the combined 220 unique genes (232 probesets) that were nominally significant after validation. For Network analysis of the 220 unique genes, STRING Interaction Network (https://string-db.org) was performed by in putting the genes into the search window and performed Multiple Proteins *Homo sapiens* analysis.

TABLES 3A & 3B

Biological Pathway Analyses of validated biomarkers (n = 232 probesets 220 genes). Table 3A. Pathways. Table 3B. Diseases.

Table 3A.

| | # | Term | Count | % | P-Value | Term | Count | % | P-Value | Top Canonical Pathways | P-Value | Overlap |
|---|---|---|---|---|---|---|---|---|---|---|---|---|
| 220 Stress Genes (n = 220, 232 probesets) | 1 | Antigen processing and presentation of exogenous peptide antigen via MHC class I, TAP-dependent | 8 | 3.7 | 9.30E–06 | Antigen processing and presentation | 8 | 3.7 | 9.80E–05 | Antigen Presentation Pathway | 1.71–E06 | 15.8% 6/38 |
| | 2 | proteasome-mediated ubiquitin-dependent protein catabolic process | 12 | 5.6 | 3.10E–05 | Viral myocarditis | 7 | 3.3 | 1.50E–04 | Natural Killer Cell Signaling | 2.67E–05 | 6.6% 8/122 |
| | 3 | negative regulation of T cell proliferation | 6 | 2.8 | 7.10E–05 | Lysosome | 9 | 4.2 | 3.60E–04 | Autoimmune Thyroid Disease Signaling | 1.02E–04 | 10.4% 5/48 |

TABLES 3A & 3B-continued

Biological Pathway Analyses of validated biomarkers (n = 232 probesets 220 genes). Table 3A. Pathways. Table 3B. Diseases.

| | | | | | | | | | | | |
|---|---|---|---|---|---|---|---|---|---|---|---|
| 4 | protein K48-linked ubiquitination | 6 | 2.8 | 2.30E−04 | Epstein-Barr virus infection | 11 | 5.1 | 1.20E−03 | Graft-versus-Host Disease Signaling | 1.02E−04 | 10.4% 5/48 |
| 5 | Antigen processing and presentation of peptide antigen via MHC class I | 5 | 2.3 | 4.10E−04 | Graft-versus-host disease | 5 | 2.3 | 1.70E−03 | Phagosome Maturation | 1.02E−04 | 5.4% 8/148 |

Table 3B.

| | # | Term | Count | % | P-Value | Diseases and Disorders | P-Value | # Molecules |
|---|---|---|---|---|---|---|---|---|
| 220 Stress Genes (n = 220 Genes, 232 probesets) | 1 | HIV | 10 | 4.7 | 1.10E−03 | Cancer | 9.75E−03-2.15E−07 | 202 |
| | 2 | Drug-Induced Liver Injury | 4 | 1.9 | 2.70E−03 | Organismal Injury and Abnormalities | 9.75E−03-2.15E−07 | 206 |
| | 3 | HIV Infections\|[X] Human immunodeficiency virus disease | 12 | 5.6 | 3.00E−03 | Infectious Diseases | 8.66E−03-2.33E−06 | 53 |
| | 4 | Malaria, Cerebral\|Malaria, Falciparum | 3 | 1.4 | 3.00E−03 | Inflammatory Response | 9.75E−03-3.06E−05 | 61 |
| | 5 | adrenal hyperplasia, congenital | 3 | 1.4 | 4.00E−03 | Metabolic Disease | 9.75E−03-6.01E−05 | 50 |

CFG Beyond Stress: Evidence for Involvement in Other Psychiatric and Related Disorders.

A CFG approach was also used to examine evidence from other psychiatric and related disorders, for the list of top predictive biomarkers after Step 4 testing (n=41) (Table 4).

TABLES 4A

Assessment for High Stress State

| Diagnosis | Best Individual Biomarker | Direction of Change in High Stress |
|---|---|---|
| All | LAIR2 | D |
| All | NUB1 | I |
| All-Females | PDZD11 | D |
| All-Females | FOXK2 | I |
| All-Males | PCDHB6 | I |
| F-BP | CIRBP | D |
| F-BP | PCBP2 | I |
| F-PSYCHOSIS | DTNBP1 | D |
| F-PSYCHOSIS | B2M | I |
| F-PTSD | CCL4 | D |
| F-PTSD | RFFL | I |
| F-SZA | DTNBP1 | D |
| F-SZA | B2M | I |
| M-BP | UQCC1 | D |
| M-BP | CLU | I |
| M-MDD | TSC22D3 | D |
| M-MDD | GJB2 | I |
| M-PSYCHOSIS | SNCA | D |
| M-PSYCHOSIS | DDX6 | I |
| M-SZ | SNCA | D |
| M-SZ | DDX6 | I |

TABLE 4B

Prediction of Risk for Future Clinical Worsening of Stress, such as Hospitalizations Due to Stress

| Diagnosis | Best Individual Biomarker | Direction of Change in High Stress |
|---|---|---|
| All | MAD1L1 | D |
| All | 1566695_at | I |
| All-Females | C1orf123 | D |
| All-Females | SESN3 | I |
| All-Males | MAD1L1 | D |
| All-Males | HIF1A | I |
| F-PSYCHOSIS | OXA1L | D |
| F-PSYCHOSIS | SESN3 | I |
| F-SZA | LRRC59 | D |
| F-SZA | DCUN1D2 | I |
| M-BP | SPON2 | D |
| M-BP | B2M | I |
| M-MDD | CCL4 | D |
| M-MDD | ANK2 | I |
| M-PSYCHOSIS | OAS1 | D |
| M-PSYCHOSIS | CAMTA1 | I |
| M-SZ | DCTN5 | D |
| M-SZ | RBFOX1 | I |
| M-SZA | HLADRB1 | D |
| M-SZA | GNPTAB | I |

Pharmacogenomics. Which of the individual top predictive biomarkers (n=41) were known to be modulated by existing drugs was analyzed using the CPG databases, and using Ingenuity Drugs analyses (Table 5).

TABLE 5

Pharmacogenomics. Top predictive biomarkers in datasets that are targets of existing drugs and are modulated by them in opposite direction.
Bold-decreased in expression; Italic-increased in expression

| Gene Symbol/ Gene Name | Probeset | Discovery (Change) Method/ Score | Prioritization Total CFG Score For Stress 6 pts | Validation Anova p-value 6 pts | Omega-3 | Antidepressants | Mood Stabilizers | Antipsychotic | Other Treatments |
|---|---|---|---|---|---|---|---|---|---|
| TL Telomere Length Reference marker from literature | | (D) | | Not Stepwise | (I) Peripheral Blood Mononuclear-cytes Omega-3 fatty acids | (I) C. Elegans Mianserin | (I) Saliva Lithium (I) Blood Lithium | (I) Peripheral Blood Leukocytes Olanzapine[228] | (I) Peripheral Blood Leukocytes Meditation[229, 230] |
| FKBP5 FK506 Binding Protein 5 | 224856_at | (D) DE/4 53.8% | 16 | 1.22E–02/ 4 Nominal | | | (I) Cerebral Cortex (right) Lithium | | (I) Blood Psychotherapy |
| FKBP5 FK506 Binding Protein 5 | 224840_at | (D) DE/2 41.5% | 14 | Not Stepwise | | | (I) Cerebral Cortex (right) Lithium | | (I) Blood Psychotherapy |
| *RTN4* Reticulon 4 | 1556049_at | (I) DE/4 54.4% | 13 | Not Stepwise | (D) Lymphocytes (females) Omega-3 | | (D) VT Valproate | | |
| OAS1 2'-5'-Oligoadenylate Synthetase 1 | 202869_at | (D) DE/4 56.9% | 13 | 1.15E–01/ 2 Stepwise | | | (I) Blood mononuclear cells Lithium | | |
| SNCA Synuclein Alpha | 215811_at | (D) AP/2 37.5% | 13 | Not Stepwise | (I) Lymphocytes (males) DBP KO-Stressed mice, Omega- | | (I) NT2.D1 cells Lithium | | |

TABLE 5-continued

Pharmacogenomics. Top predictive biomarkers in datasets that are targets of existing drugs and are modulated by them in opposite direction.
Bold-decreased in expression; Italic-increased in expression

| Gene Symbol/ Gene Name | Probeset | Discovery (Change) Method/ Score 6 pts | Prioritization Total CFG Score For Stress | Validation Anova p-value 6 pts | Omega-3 | Anti-depressants | Mood Stabilizers | Anti-psychotic | Other Treatments |
|---|---|---|---|---|---|---|---|---|---|
| *B2M* Beta-2-Microglobulin | 232311_at | (I) DE/6 91.2% | 11 | Not Stepwise | 3 fatty acids (D) NAC (females) DBP KO-Stressed mice, Omega-3 fatty acids | | | | 4'-iodo-4'-deoxy-doxorubicin |
| *NUB1* Negative Regulator Of Ubiquitin Like Proteins 1 | 1560108_at | (I) DE/4 61.8% | 12 | 2.34E−02/ 4 Nominal | | | | (D) VT Clozapine | |
| *GJB2* Gap Junction Protein Beta 2 | 223278_at | (I) DE/2 48.5% | 8 | 2.42E−02/ 4 Nominal | | | | (D) VT Clozapine | |
| *HIF1A* Hypoxia Inducible Factor 1 Alpha Subunit | 238869_at | (I) DE/4 54.4% | 8 | 1.11E−02/ 4 Nominal | | | | | EZN 2968 |
| LRRC59 Leucine Rich Repeat Containing 59 | 222231_s_at | (D) DE/4 61.5% | 6 | 3.15E−02/ 4 Nominal | | | | (I) CP Valproate | |
| PSD3 Pleckstrin And Sec7 Domain Containing 3 | 218613_at | (D) AP/6 100% | 8 | Not Stepwise | | | | (I) VT Clozapine | |
| STX11 Syntaxin 11 | 210190_at | (D) DE/2 49.2% | 6.5 | 2.74E−02/ 4 Nominal | | (I) MNC Anti-depressants | (I) Lymphoblastoid cell cultures Lithium (I) Lymphoblastoid cell cultures Valproate | | |
| *ANK2* Ankyrin 2 | 202921_s_at | (I) DE/4 52.9% | 6 | 1.09E−02/ 4 Nominal | | (D) C.elegans Mianserin | | | |
| HLA-DRB1 Major Histocompatibility Complex, Class II, DR Beta 1 | 209312_x_at | (D) DE/2 41.5% | 6 | 1.22E−02/ 4 Nominal | | | | | apolizumab |

TABLE 5-continued

Pharmacogenomics. Top predictive biomarkers in datasets that are targets of existing drugs and are modulated by them in opposite direction.
Bold-decreased in expression; Italic-increased in expression

| Gene Symbol/ Gene Name | Probeset | Discovery (Change) Method/ Score 6 pts | Prior- itiza- tion Total CFG Score For Stress | Vali- dation Anova p-value 6 pts | Omega-3 | Anti- depres- sants | Mood Stabil- izers | Anti- psychotic | Other Treat- ments |
|---|---|---|---|---|---|---|---|---|---|
| LAIR2 Leukocyte Associated Immuno- globulin Like Receptor 2 | 207509_s_at | (D) DE/6 98.5% | 6 | Not Stepwise | | (I) Blood Anti- depres- sants | | | |

New drug discovery/repurposing. Drugs and natural compounds were analyzed to determine an opposite match for the gene expression profiles of panels of the top predictive biomarkers, using the Connectivity Map (portals.broadinstitute.org, Broad Institute, MIT) (Table 6). 140 out of the nominally validated 232 probesets from Step 3 were present in the HGU-133A array used for the Connectivity Map. Out of these, gene expression signatures of the probesets that were predictive in Step 4 (nominally significant) were compiled for all participants, as well as separately for males, for females, and personalized by gender and diagnosis.
Tables 6A-6E. New Methods of Use for Therapeutics. Discovery of new method of use for drugs/repurposing.

Connectivity Map (CMAP) analysis. Query for signature is done using exact Affymetrix probesets and direction of change. Drugs that have opposite gene expression profile effects to our high stress biomarkers signatures. A score of −1 indicates the perfect match, i.e. the best potential therapeutic for decreasing stress. NIH LINCS analysis using the L1000CDS2 (LINCS L1000 Characteristic Direction Signature Search Engine) tool. Query for signature is done using gene symbols and direction of change. Shown are compounds mimicking the opposite direction of change in high stress. A higher score indicates a better match.
Drug Repurposing Using Connectivity Map (CMAP from Broad Institute/MIT)

TABLE 6A

Drugs Identified Using Gene Expression Panels of Validated Biomarkers.
(22 increased and 118 decreased were present in HG-U133A array used by CMAP).
Panel of 22 genes increased in expression:
ANK2, CACNA1H, CADM4, CBX1, CRHR1, CYP11B1, CYP19A1, CYP2E1,
FOXK2, GRIA1, IGKC, LDB3, LINC-PINT,
MCM3AP, N4BP2L2, NACC1, NCDN, PDHX, PEG3, SFRP1, SPN, TFPI
Panel of 118 genes decreased in expression:
ACTR1A, ADA2, AK2(4), APLP2, APOL3, ASCC1, ATG12, BUB3, C1orf123, CD1D,
CIAPIN1, CIRBP, CLTA, CSNK2A1, CTSZ, CYBB, DAZAP2, DBNDD2, DMAC2,
DNAJB1, DYNLRB1, EFCAB14, EFHD2, EIF6, ELF4, ELMO2, ENTPD1(2),
ESD, FGR, FLI1, FUCA1, GTPBP2, H2AFY, HDAC3, HLA-B, HLA-DMA,
HLA-DRB1, HLA-F, HLA-G, HMOX1, IDH3B(2),
IPO4, ISG20, KIR3DL2, KPNA6, LAIR1, LAPTM5, LEPROTL1, LILRB1, LIPA,
LRRC59, MAD1L1, MAN2B2, MARCKSL1, MDH2(2), MECP2, MED24, MFNG, MIA3,
MPV17, MR1, MRPS18B, NAAA, NAGA, NAGK, NONO, OCRL, OPA3, OXA1L,
PAFAH2, PDE6D, PIK3R5, PLAGL2, PLPBP, POLR3C, PPP1R7, PSMA5, PSMC4,
PSME1, PSME3, RAC1, RAC2(2), RNF216, RNF5, RPP40, RUBCN, SASH3, SCAMP1,
SEC13, SFXN3, SMUG1, SNHG17, SPG7, STX11, TCTN3, TIMP1, TM9SF4, TMBIM6
TMEM80, TNFAIP1, TOR1B, TOR4A, TPP1, TRAK1, TSC22D3, UBE2A, UQCC1,
USP39, VAMP3, XPNPEP1, ZFYVE21

| rank | CMAP name | score | Description |
|---|---|---|---|
| 1 | cefotiam | −1 | Parenteral second-generation cephalosporin antibiotic; broad-spectrum activity against Gram-positive and Gram-negative bacteria; as a beta-lactam, its bactericidal activity results from the inhibition of cell wall synthesis via affinity for penicillin-binding proteins |
| 2 | proguanil | −0.991 | In combination with Atovaquone as antimalarial agent; |
| 3 | hydroxyachillin | −0.96 | A sesquiterpene lactone, and the main component isolated from aerial parts of Tanacetum microphyllum DC, the last is used in folk medicine as an anti-inflammatory and anti-ulcer agent; inhibition of protein kinase C may be one of the mechanisms |

TABLE 6A-continued

Drugs Identified Using Gene Expression Panels of Validated Biomarkers.
(22 increased and 118 decreased were present in HG-U133A array used by CMAP).
Panel of 22 genes increased in expression:
ANK2, CACNA1H, CADM4, CBX1, CRHR1, CYP11B1, CYP19A1, CYP2E1,
FOXK2, GRIA1, IGKC, LDB3, LINC-PINT,
MCM3AP, N4BP2L2, NACC1, NCDN, PDHX, PEG3, SFRP1, SPN, TFPI
Panel of 118 genes decreased in expression:
ACTR1A, ADA2, AK2(4), APLP2, APOL3, ASCC1, ATG12, BUB3, C1orf123, CD1D,
CIAPIN1, CIRBP, CLTA, CSNK2A1, CTSZ, CYBB, DAZAP2, DBNDD2, DMAC2,
DNAJB1, DYNLRB1, EFCAB14, EFHD2, EIF6, ELF4, ELMO2, ENTPD1(2),
ESD, FGR, FLI1, FUCA1, GTPBP2, H2AFY, HDAC3, HLA-B, HLA-DMA,
HLA-DRB1, HLA-F, HLA-G, HMOX1, IDH3B(2),
IPO4, ISG20, KIR3DL2, KPNA6, LAIR1, LAPTM5, LEPROTL1, LILRB1, LIPA,
LRRC59, MAD1L1, MAN2B2, MARCKSL1, MDH2(2), MECP2, MED24, MFNG, MIA3,
MPV17, MR1, MRPS18B, NAAA, NAGA, NAGK, NONO, OCRL, OPA3, OXA1L,
PAFAH2, PDE6D, PIK3R5, PLAGL2, PLPBP, POLR3C, PPP1R7, PSMA5, PSMC4,
PSME1, PSME3, RAC1, RAC2(2), RNF216, RNF5, RPP40, RUBCN, SASH3, SCAMP1,
SEC13, SFXN3, SMUG1, SNHG17, SPG7, STX11, TCTN3, TIMP1, TM9SF4, TMBIM6
TMEM80, TNFAIP1, TOR1B, TOR4A, TPP1, TRAK1, TSC22D3, UBE2A, UQCC1,
USP39, VAMP3, XPNPEP1, ZFYVE21

| rank | CMAP name | score | Description |
|---|---|---|---|
| 4 | Prestwick-682 | −0.95 | AKA Clofilium tosylate; K+ channel blocker; cardiac depressant; anti-arrhythmic; increases atrial and ventricular effective refractory period without changing conduction time and, despite no apparent change in premature ventricular complex frequency, it can abolish the ability to induce ventricular tachycardia by programmed stimulation and is also well tolerated |
| 5 | levopropoxyphene | −0.949 | Stereoisomer of propoxyphene; was sold as an antitussive, but it was removed from the market in the 70s because data showed that the drug can cause serious toxicity to the heart, even when used at therapeutic doses; was developed by Lilly and FDA approved on Mar. 21st, 1962 |
| 6 | isoflupredone | −0.943 | Isoflupredone, also known as deltafludrocortisone and 9α-fluoroprednisolone, is a synthetic glucocorticoid corticosteroid which was never marketed. Its acetate ester, isoflupredone acetate, is used in veterinary medicine. |
| 7 | ozagrel | −0.941 | Antiplatelet agent working as a thromboxane A2 synthesis inhibitor; has been used in trials studying the treatment of Dry Eye Syndromes. |
| 8 | streptozocin | −0.938 | Antineoplastic, aklylating agent; inhibits DNA synthesis by alkylation and cross-linking the strands of DNA, and by possible protein modification; cell cycle nonspecific; black box warning for dose-related and cumulative renal toxicity and secondary malignancy |
| 9 | cyclopenthiazide | −0.934 | Thiazide diuretic used in the treatment of heart failure and hypertension; positive allosteric modulator at AMPA-A receptors. |
| 10 | metformin | −0.93 | Biguanide antihyperglycemic agent; decreases hepatic glucose production, decreases intestinal absorption of glucose and improves insulin sensitivity (increases peripheral glucose uptake and utilization); black box warning for lactic acidosis; contraindicated in severe renal dysfunction (eGFR <30 mL/minute/1.73 m2) and acute or chronic metabolic acidosis with or without coma (including diabetic ketoacidosis). Wang et al. 2017 has found that metformin down-regulates the AMPK pathway, which is increased after single prolonged stress in rat models. Fan et al. 2019 has reported that metform increases miniature inhibitory postsynaptic currents via upregulating the membrane insertion of GABAA receptors, providing anxiolytic effects in rat models. Erensoy et al. 2019 has concluded that metformin decreases anxiety (measured using the Beck Anxiety Inventory) in women diagnosed with polycystic ovary syndrome. |

TABLE 6A-continued

Drugs Identified Using Gene Expression Panels of Validated Biomarkers.
(22 increased and 118 decreased were present in HG-U133A array used by CMAP).
Panel of 22 genes increased in expression:
ANK2, CACNA1H, CADM4, CBX1, CRHR1, CYP11B1, CYP19A1, CYP2E1,
FOXK2, GRIA1, IGKC, LDB3, LINC-PINT,
MCM3AP, N4BP2L2, NACC1, NCDN, PDHX, PEG3, SFRP1, SPN, TFPI
Panel of 118 genes decreased in expression:
ACTR1A, ADA2, AK2(4), APLP2, APOL3, ASCC1, ATG12, BUB3, C1orf123, CD1D,
CIAPIN1, CIRBP, CLTA, CSNK2A1, CTSZ, CYBB, DAZAP2, DBNDD2, DMAC2,
DNAJB1, DYNLRB1, EFCAB14, EFHD2, EIF6, ELF4, ELMO2, ENTPD1(2),
ESD, FGR, FLI1, FUCA1, GTPBP2, H2AFY, HDAC3, HLA-B, HLA-DMA,
HLA-DRB1, HLA-F, HLA-G, HMOX1, IDH3B(2),
IPO4, ISG20, KIR3DL2, KPNA6, LAIR1, LAPTM5, LEPROTL1, LILRB1, LIPA,
LRRC59, MAD1L1, MAN2B2, MARCKSL1, MDH2(2), MECP2, MED24, MFNG, MIA3,
MPV17, MR1, MRPS18B, NAAA, NAGA, NAGK, NONO, OCRL, OPA3, OXA1L,
PAFAH2, PDE6D, PIK3R5, PLAGL2, PLPBP, POLR3C, PPP1R7, PSMA5, PSMC4,
PSME1, PSME3, RAC1, RAC2(2), RNF216, RNF5, RPP40, RUBCN, SASH3, SCAMP1,
SEC13, SFXN3, SMUG1, SNHG17, SPG7, STX11, TCTN3, TIMP1, TM9SF4, TMBIM6
TMEM80, TNFAIP1, TOR1B, TOR4A, TPP1, TRAK1, TSC22D3, UBE2A, UQCC1,
USP39, VAMP3, XPNPEP1, ZFYVE21

| rank | CMAP name | score | Description |
|---|---|---|---|
| 11 | corticosterone | −0.925 | Hormone secreted by the adrenal cortex; one of the glucocorticoids; important mainly as an intermediate in the steroidogenic pathway from pregnenolone to aldosterone; precursor molecule to the mineralocorticoid aldosterone, one of the major homeostatic modulators of sodium and potassium levels in vivo; With emotional memories, corticosterone is largely associated with fear memory recognition. Jia et al. 2015 has reported that prophylactic and therapeutic corticosterone therapy diminished hyperarousal and exaggerated innate fear response in rat models of PTSD. |
| 12 | calcium folinate | −0.924 | Also known as leucovorin. Calcium folinate actively competes with methotrexate for transport sites, displaces methotrexate from intracellular binding sites, and restores active folate stores required for DNA/RNA synthesis. It is used as a rescue agent for methotrexate therapy. |
| 13 | diphenhydramine | −0.921 | An antihistamine that also has anticholinergic and sedative effects. |
| 14 | dapsone | −0.915 | Competitive antagonist of para-aminobenzoic acid (PABA) and prevents normal bacterial utilization of PABA for the synthesis of folic acid. |
| 15 | spiramycin | −0.913 | A macrolide antibiotic. |
| 16 | asiaticoside | −0.906 | A constituent of Centella asiatica. Commonly referred to as Gotu Kola. It is a member of the parsley family. It is commonly utilized for fatigue, anxiety, depression, psychiatric disorders, Alzheimer's disease, and improving memory. Bradwejn et al. 2000 has concluded that asiaticoside has anxiolytic activity in humans due to reduced acoustic startle response. |

TABLE 6B

Drugs Identified Using Gene Expression Panels of Predictive Biomarkers in All. (5 increased and 52 decreased were present in HG-U133A array used by CMAP).

| rank | CMAP name | score | Description |
|---|---|---|---|
| 1 | ambroxol | −1 | Secretolytic agent used in the treatment of respiratory diseases associated with viscid or excessive mucus; not marketed in the US; inhibits the NO-dependent activation of soluble guanylate cyclase; Recently, a hypothesis suggested that it may have a potential role in treatment of Paget's disease of bone, Parkinsonism, and other common diseases of aging-associated diseases involving dysfunction of autophagy. |
| 2 | ozagrel | −0.971 | Antiplatelet agent working as a thromboxane A2 synthesis inhibitor; has been used in trials studying the treatment of Dry Eye Syndromes. |

TABLE 6B-continued

Drugs Identified Using Gene Expression Panels of Predictive Biomarkers in All. (5 increased and 52 decreased were present in HG-U133A array used by CMAP).

| rank | CMAP name | score | Description |
|---|---|---|---|
| 3 | cefotiam | −0.959 | Parenteral second-generation cephalosporin antibiotic; broad-spectrum activity against Gram-positive and Gram-negative bacteria; as a beta-lactam, its bactericidal activity results from the inhibition of cell wall synthesis via affinity for penicillin-binding proteins |
| 4 | xamoterol | −0.951 | Cardiac stimulant; β1-adrenoceptor partial agonist that has shown to improve systolic and diastolic function in studies with heart failure patients; has no agonist action on β2-adrenoceptors; Suspected of damaging fertility or the unborn child. Schutsky et al. 2011 has reported that xamoterol impairs the retrieval of memory in rats via $G_{i/o}$-coupled $β_2$ signaling. |
| 5 | betulin | −0.93 | Abundant, naturally occurring triterpene; commonly isolated from the bark of birch trees; has a role as a metabolite, an antiviral agent, an analgesic, an anti-inflammatory agent and an antineoplastic agent; Inhibition of SREBP by betulin decreased the biosynthesis of cholesterol and fatty acids; In vivo, betulin ameliorated diet-induced obesity, decreased the lipid contents in serum and tissues, and increased insulin sensitivity; Furthermore, betulin reduced the size and improved the stability of atherosclerotic plaques. Puniani et al. 2014 has concluded that betulinic acid is the active principle in Sourouhea compounds and has anxiolytic effects as shown by an increased elevated plus maze with rat models. Delcellier 2015 has reported that a botanical blend extract of compounds containing betulinic acid may be useful in PTSD as it disrupted fear memory reconsolidation with no memory impairment in rat models. There is currently a patent for a pharmaceutical preparation containing betulinic acid fo use of preventing or treating anxiety (Durst et al. 2002). |
| 6 | isometheptene | −0.927 | Sympathomimetic amine sometimes used in the treatment of migraines and tension headaches due to its vasoconstricting properties; along with paracetamol and dichloralphenazone, it is one of the constituents of Amidrine; FDA notified manufacturers and labelers on Oct. 12, 2017, to stop distributing their isometheptene mucate-containing drug products (containing either isometheptene mucate, dichloralphenazone, and acetaminophen or isometheptene mucate, caffeine, and acetaminophen) |
| 7 | primidone | −0.925 | Barbiturate, anticonvulsant; decreases neuron excitability, raises seizure threshold similar to phenobarbital; active metabolite PEMA may enhance activity of phenobarbital; increased risk of suicidal thoughts/behavior; use with caution in patients with a history of drug abuse-potential for drug dependency exists. Anticonvulsants have been suggested as potential treatments for PTSD due to the similarities between kindling in seizure disorders and behavioral sensitization in PTSD (Friedman 1994; Post et al. 1999). |
| 8 | tocainide | −0.919 | Class Ib antiarrhythmic agent; no longer sold in the United States; produces dose dependent decreases in sodium and potassium conductance, thereby decreasing the excitability of myocardial cells |
| 9 | diloxanide | −0.919 | Anti-protozoal drug used in the treatment of *Entamoeba histolytica* and some other protozoal infections; although it is not currently approved for use in the United States, it was approved by a CDC study in the treatment of 4,371 cases of *Entamoeba histolytica* from 1977 to 1990; during pregnancy it is recommended that it be taken after the first trimester; works only in the digestive tract |
| 10 | alprostadil | −0.913 | Causes vasodilation by means of direct effect on vascular and ductus arteriosus smooth muscle; commonly used for erectile dysfunction; BBW for apnea in neonates with congenital heart defects; phosphodiesterase type 5 inhibitor |

Panel of 5 genes increased in expression: CYP19A1, CYP2E1, GRIA1, IGKC, SFRP1

Panel of 52 genes decreased in expression: ACTR1A, AK2(2), APOL3, ATG12, BUB3, C1orf123, CIRBP, CLTA, CSNK2A1, DAZAP2, DMAC2, EIF6, ELMO2, ESD, HLAB, HLADMA, HLADRB1, HMOX1, IDH3B(2), LAIR1, LRRC59, MAD1L1, MARCKSL1, MDH2, MED24, MFNG, MPV17, MR1, MRPS18B, NAGA, NAGK, OXA1L, PAFAH2, PIK3R5, POLR3C, PPP1R7, PSME1, RAC1, RAC2, RNF216, SASH3, SCAMP1, SEC13, SMUG1, SNHG17, SPG7, TIMP1, USP39, VAMP3, ZFYVE21

TABLE 6C

Drugs Identified Using Gene Expression Panels of Predictive Biomarkers in Males. (5 increased and 48 decreased were present in HG-U133A array used by CMAP).

| rank | CMAP name | score | Description |
|---|---|---|---|
| 1 | ozagrel | −1 | Antiplatelet agent working as a thromboxane A2 synthesis inhibitor; has been used in trials studying the treatment of Dry Eye Syndromes. |
| 2 | flucloxacillin | −0.981 | Narrow-spectrum beta-lactam antibiotic of the penicillin class; not currently available in the US; very similar to dicloxacillin-they are considered interchangeable. Lurie et al. 2015 has reported that recurrent exposures to penicllins is associated with an increased risk for anxiety. |
| 3 | ambroxol | −0.97 | Secretolytic agent used in the treatment of respiratory diseases associated with viscid or excessive mucus; not marketed in the US; inhibits the NO-dependent activation of soluble guanylate cyclase; Recently, a hypothesis suggested that it may have a potential role in treatment of Paget's disease of bone, Parkinsonism, and other common diseases of aging-associated diseases involving dysfunction of autophagy. |

TABLE 6C-continued

Drugs Identified Using Gene Expression Panels of Predictive Biomarkers in Males. (5 increased and 48 decreased were present in HG-U133A array used by CMAP).

| rank | CMAP name | score | Description |
|---|---|---|---|
| 4 | dapsone | −0.958 | Competitive antagonist of para-aminobenzoic acid (PABA) and prevents normal bacterial utilization of PABA for the synthesis of folic acid; Prolonged use may result in fungal or bacterial superinfection, including *C. difficile*-associated diarrhea and *pseudomembranous colitis*-CDAD has been observed >2 months postantibiotic treatment. Zhang et al. 2015 has concluded that pretreatment with dapsone improved surgical stress induced depressive and anxiety-like behavior in aged mice. |
| 5 | tiaprofenic acid | −0.955 | A nonsteroidal anti-inflammatory drug of the arylpropionic acid class, used to treat pain, especially arthritic pain; not recommended in children; may be a potentially inappropriate medication to be avoided in patients 65 years and older (unless alternative agents ineffective and patient can receive concomitant gastroprotective agent) due to increased risk of GI bleeding and peptic ulcer disease in older adults in high risk category |
| 6 | primidone | −0.939 | Barbiturate, anticonvulsant; decreases neuron excitability, raises seizure threshold similar to phenobarbital; active metabolite PEMA may enhance activity of phenobarbital; increased risk of suicidal thoughts/behavior; use with caution in patients with a history of drug abuse-potential for drug dependency exists. Anticonvulsants have been suggested as potential treatments for PTSD due to the similarities between kindling in seizure disorders and behavioral sensitization in PTSD (Friedman 1994; Post et al. 1999). |
| 7 | betulin | −0.936 | Abundant, naturally occurring triterpene; commonly isolated from the bark of birch trees; has a role as a metabolite, an antiviral agent, an analgesic, an anti-inflammatory agent and an antineoplastic agent; Inhibition of SREBP by betulin decreased the biosynthesis of cholesterol and fatty acids; In vivo, betulin ameliorated diet-induced obesity, decreased the lipid contents in serum and tissues, and increased insulin sensitivity; Furthermore, betulin reduced the size and improved the stability of atherosclerotic plaques. Puniani et al. 2014 has concluded that betulinic acid is the active principle in Souroubea compounds and has anxiolytic effects as shown by an increased elevated plus maze with rat models. Delcellier 2015 has reported that a botanical blend extract of compounds containing betulinic acid may be useful in PTSD as it disrupted fear memory reconsolidation with no memory impairment in rat models. There is currently a patent for a pharmaceutical preparation containing betulinic acid fo use of preventing or treating anxiety (Durst et al. 2002). |
| 8 | proguanil | −0.929 | In combination with Atovaquone as antimalarial agent; Metabolite cycloguanil inhibits dihydrofolate reductase, disrupting deoxythymidylate synthesis; Together, atovaquone/cycloguanil affect the erythrocytic and exoerythrocytic stages of development; Use is contraindicated for malaria prophylaxis in patients with severe renal impairment (CrCl less than 30 mL/min) because of the risk of pancytopenia. |
| 9 | gossypol | −0.925 | Gossypium hirsutum; most common source is the stem, seeds, and roots of the cotton plant, where it acts as a natural defensive agent by provoking infertility in insects; Orally, gossypol is used as a male contraceptive and in treating uterine myoma, endometriosis, dysfunctional uterine bleeding, metastatic carcinoma of the endometrium or ovary, and HIV disease; Topically, gossypol is used as a spermicidal cream or gel; inhibitory effects on spermatogenesis are not predictably reversible, although sperm counts usually return to normal within three months to two years after discontinuation |
| 10 | levopropoxyphene | −0.92 | Stereoisomer of propoxyphene; was sold as an antitussive, but it was removed from the market in the 70s because data showed that the drug can cause serious toxicity to the heart, even when used at therapeutic doses; was developed by Lilly and FDA approved on Mar. 21, 1962 |

Panel of 5 genes increased in expression: CYP19A1, CYP2E1, IGKC, MCM3AP, SFRP1
Panel of 48 genes decreased in expression: ACTR1A, AK2(2), APOL3, ATG12, C1orf123, CIRBP, CLTA, CSNK2A1, DAZAP2, DMAC2, EIF6, ELMO2, FLI1, HLAB, HLADMA, HLADRB1, HMOX1, IDH3B(2), LAIR1, LRRC59, MAD1L1, MARCKSL1, MFNG, MR1, MRPS18B, NAGA, NAGK, OXA1L, PAFAH2, PIK3R5, POLR3C, PPP1R7, PSME1, RAC1, RAC2, RNF216, SASH3, SEC13, SFXN3, SNHG17, SPG7, TIMP1, USP39, VAMP3, XPNPEP1, ZFYVE21

TABLE 6D

Drugs Identified Using Gene Expression Panels of Predictive Biomarkers in Females. (9 increased and 21 decreased were present in HG-U133A array used by CMAP).

| rank | CMAP name | score | Description |
|---|---|---|---|
| 1 | flecainide | −1 | Class 1c antiarrhythmic agent; slows conduction in cardiac tissue by altering transport of ions across cell membranes; causes slight prolongation of refractory periods; decreases the rate of rise of the action potential without affecting its duration; increases electrical stimulation threshold of ventricle, His-Purkinje system; possesses local anesthetic and moderate negative inotropic effects; BBW for excessive mortality or nonfatal cardiac arrest rate and ventricular proarrhythmic effects in patients with atrial fibrillation/flutter |
| 2 | Prestwick-682 | −0.997 | AKA Clofilium tosylate; K+ channel blocker; cardiac depressant; anti-arrhythmic; increases atrial and ventricular effective refractory period without changing conduction time and, despite no apparent change in premature ventricular complex frequency, it can abolish the ability to induce ventricular tachycardia by programmed stimulation and is also well tolerated |
| 3 | spiramycin | −0.98 | Macrolide antibiotic and antiparasitic; not commercially available in the US; Prolonged use may result in fungal or bacterial superinfection, including *C. difficile*-associated diarrhea (CDAD) and *pseudomembranous colitis*-CDAD has been observed >2 months postantibiotic treatment. |
| 4 | domperidone | −0.974 | Antiemetic, gastroprokinetic agent, and galactagogue; peripheral dopamine receptor blocking properties and does not readily cross the blood-brain barrier; facilitates gastric emptying and decreases small bowel transit time; Canadian BBW for "increased risk of serious ventricular arrhythmias or sudden cardiac death, particularly with doses >30 mg or when used in patients >60 years of age. Use the lowest possible dose for the shortest duration necessary." Itoh et al. 2005 has reported that dromperidone may be beneficial in stress-related diseases as it significantly suppresses increases in plasma ACTH motilin-immunoreactive substance and cortisol levels compared to placebo. |
| 5 | homatropine | −0.967 | Anticholinergic medication that is an antagonist at muscarinic acetylcholine receptors and thus the parasympathetic nervous system; used in eye drops as a cycloplegic, and as a mydriatic. There is currently a patent for scopolamine analogues for the treatment of depression and anxiety (Furey et al. 2005). |
| 6 | isoniazid | −0.964 | Antitubercular agent; inhibits the synthesis of mycoloic acids, an essential component of the bacterial cell wall; BBW for severe and sometimes fatal hepatitis associated with isoniazid therapy has been reported and may occur or may develop even after many months of treatment; Health Canada conducted a safety review and concluded that there is a rare potential risk of pancreatitis with the use of isoniazid. Case studies report controversial results for benefit of isoniazid in anxiety and depressive states (Salzer et al. 1953; Lemere 1954). |
| 7 | proguanil | −0.964 | In combination with Atovaquone as antimalarial agent; Metabolite cycloguanil inhibits dihydrofolate reductase, disrupting deoxythymidylate synthesis; Together, atovaquone/cycloguanil affect the erythrocytic and exoerythrocytic stages of development; Use is contraindicated for malaria prophylaxis in patients with severe renal impairment (CrCl less than 30 mL/min) because of the risk of pancytopenia. |
| 8 | phentolamine | −0.958 | Anti-hypertensive agent; Competitively blocks alpha-adrenergic receptors (nonselective) to produce brief antagonism of circulating epinephrine and norepinephrine to reduce hypertension caused by alpha effects of these catecholamines; positive inotropic and chronotropic effect on the heart thought to be due to presynaptic alpha-2 receptor blockade which results in release of presynaptic norepinephrine. There was recently a patent for treatment of anxiety disorders, including PTSD, with α and β blockers (Khan et al. 2011). |
| 9 | sulfamono-methoxine | −0.952 | Long-acting sulfonamide antibiotic; It is used in blood kinetic studies as well as to study the formation of capsules in *Bordetella bronchiseptica*; Sulfamonomethoxine is used to combat hyperpyrexia of unknown etiology. Lurie et al. 2015 has reported that recurrent exposures to sulfonamides is associated with an increased risk for anxiety. |

TABLE 6D-continued

Drugs Identified Using Gene Expression Panels of Predictive Biomarkers in Females. (9 increased and 21 decreased were present in HG-U133A array used by CMAP).

| rank | CMAP name | score | Description |
|------|-----------|-------|-------------|
| 10 | fludrocortisone | −0.951 | Corticosteroid; Very potent mineralocorticoid with high glucocorticoid activity; used primarily for its mineralocorticoid effects; Promotes increased reabsorption of sodium and loss of potassium from renal distal tubules. de Kloet et al. 2016 has found that fludrocortisone decreased cortisol secretion and may be more effective in young depressed patients. |

Panel of 9 genes increased in expression: ANK2, CBX1, CYP19A1, FOXK2, GRIA1, IGKC, LDB3, LINCPINT, NACC1
Panel of 21 genes decreased in expression: ASCC1, AT12, C1orf123, CIAPIN1, CIRBP, ESD, GTPBP2, H2AFY, HMOX1, IPO4, LAIR1, LIPA, MARCKSL1, MDH2, MED24, MRPS18B, PAFAH2, PLAGL2, SMUG1, SNHG17, USP39

Drug Repurposing Using L1000 Characteristic Direction Signature Search Engine

TABLE 6E

Drugs Identified Using Gene Expression Panels of Nominally Validated Biomarkers. (n = 221 genes)

| Rank | Score | Drug | Description |
|------|-------|------|-------------|
| 1 | 0.0714 | BRD-K46137903 | |
| 2 | 0.0655 | Doxepin hydrochloride | |
| 3 | 0.0595 | trichostatin A | |
| 4 | 0.0595 | CGS 15943 | |
| 5 | 0.0595 | (−)-Gallocatechin gallate | |
| 6 | 0.0595 | OSI-906 | |
| 7 | 0.0595 | BRD-K74777906 | |
| 8 | 0.0595 | B3063 | |
| 9 | 0.0595 | BRD-K33396764 | |
| 10 | 0.0595 | BRD-K68336408 | |
| 11 | 0.0595 | BRD-A72703248 | |
| 12 | 0.0536 | AT-7519 | |
| 13 | 0.0536 | LY 288513 | |
| 14 | 0.0536 | Biperiden hydrochloride | |
| 15 | 0.0536 | DILTIAZEM HYDROCHLORIDE | |
| 16 | 0.0536 | ESTRIOL | |
| 17 | 0.0536 | Molindone hydrochloride | |
| 18 | 0.0536 | PX12 | |
| 19 | 0.0536 | APO866 | |
| 20 | 0.0536 | AT-CSC-07 BRD-K33720404 | |

Panel of 60 genes increased in expression: ANK2, ANKRD28, CACNA1H, CADM4, CAMTA1, CARS2, CBX1, CPM, CRHR1, CYP11B1, CYP19A1, CYP2E1, DMGDH, DSCAM, FBXO34, FOXK2, GJB2, GNPTAB, GPCPD1, GRIA1, HHIP, HIF1A, Hs.567066, IGKC, KCNMA1, KDM4C, LDB3, LINC-PINT, LOC105370523, MCM3AP, MKL2, MNAT1, N4BP2L2, NACC1, NCDN, NKTR, NTRK2, NUB1, PCBP2, PCDHB6, PDHX, PEG3, PLAGL1, PLEKHA5, PSTK, RAB6A, RBFOX1, RFFL, RORA, SEC14L2, SERPINB1, SESN3, SFRP1, SPN, TFPI, TTF2, TULP4, UBE2B, VPS13C, ZNF638
Panel of 161 genes decreased in expression: ABHD12, ACTR1A, ADA2, AK2, ALKBH6, APLP2, APOL3, ARSB, ARSD, ASCC1, ATG12, BUB3, C1orf123, C1orf162, CD1D, CD44, CIAPIN1, CIRBP, CLTA, COG1, COPZ1, CSNK2A1, CTSC, CTSZ, CYBB, DAZAP2, DBNDD2, DMAC2, DNAJB1, DYNLRB1, EFCAB14, EFHD2, EIF6, ELF4, ELMO2, EMC4, ENTPD1, ESD, FGR, FKBP5, FLI1, FUCA1, GLMP, GTPBP2, H2AFY, HDAC3, HLA-B, HLA-DMA, HLA-DRB1, HLA-F, HLA-G, HMOX1, HNRNPDL, HSH2D, IDH3B, INO80, IPO4, ISG20, ITPKB, KIR3DL2, KPNA6, LAIR1, LAPTM5, LCP2, LEPROTL1, LILRB1, LIPA, LRRC59, MAD1L1, MAN2B2, MARCKSL1, MDH2, MECP2, MED24, MEF2C, MFNG, MIA3, MPV17, MR1, MRPL44, MRPS18B, NAAA, NAF1, NAGA, NAGK, NDFIP1, NONO, OCRL, ODF2, OPA3, OXA1L, PAFAH2, PDE6D, PHYKPL, PIK3R5, PLAGL2, PLPBP, POLR3C, PPP1R11, PPP1R7, PSMA5, PSMC4, PSME1, PSME3, RABL6, RAC1, RAC2, RNF213, RNF216, RNF5, RPP40, RUBCN, SAP30L, SASH3, SCAMP1, SCO1, SDCCAG8, SEC13, SESTD1, SETDB2, SFXN3, SLC35A4, SMUG1, SNHG17, SPEN, SPG7, STAM2, STX11, SURF4, TCTN3, TIMP1, TM9SF4, TMBIM6, TMEM173, TMEM179B, TMEM80, TNFAIP1, TOMM40L, TOR1B, TOR4A, TPP1, TRAK1, TRAV25, TRBV24-1, TSC22D3, UBE2A, UBE2E2, UHRF1BP1L, UQCC1, USP39, VAMP3, VIRMA, VPS26B, VTI1A, WDFY1, WWP2, XPNPEP1, ZFYVE21, ZNF655, ZNF689, ZNF747

Convergent Functional Evidence (CFE)

For the top predictive biomarkers (n=42), all the evidence from discovery (up to 6 points), prioritization (up to 12 points), validation (up to 6 points), testing (state, trait first year Hospitalization with Stress visits, trait all future Hospitalization with Stress visits were tabulated into a convergent functional evidence (CFE) score-up to 8 points each if significantly predicts in all participants, 6 points if predicts by gender, 4 points if predicts in gender/diagnosis), other psychiatric and related disorders (3 points), and drug evidence (3 points). The total score can be up to 54 points: 36 from the data and 18 from literature data. The data weighed twice as much as the literature data. The goal was to highlight, based on the totality of the data and of the evidence in the field to date, biomarkers that have all around evidence: track stress, predict it, are reflective of stress and other pathology, and are potential drug targets. Such biomarkers merit priority evaluation in future clinical trials.

Results

Step 1: Discovery of Biomarkers for Stress

A powerful within-participant longitudinal discovery approach was used to identify genes that: (1) change in expression in blood between low stress states (Life Stress VAS≤33 out of 100) and high stress states (Life Stress VAS≥67 out of 100), (2) track the stress state across visits in a participant, and (3) track stress state in multiple participants. A longitudinally followed cohort of psychiatric participants was used to show diametric changes in stress states between at least two testing visits (n=36 participants) (FIGS. 1A-1G and Table 1). The stress state self-report may be more reliable in this cohort, as the subjects demonstrated the aptitude and willingness to report different, and diametric, stress states. Using 33% of maximum raw score threshold (internal score of 1 pt), 12,884 unique probesets (FIG. 1D) were identified. These were carried forward to the prioritization step. This represents approximately a 4-fold enrichment of the 54,625 probesets on the Affymetrix array.

It was also examined in the discovery cohort whether subtypes of stress can be identified based on mental state at the time of high stress visits, using two way hierarchical clustering with anxiety, mood, and psychosis measures. Three potential subtypes of stress were identified: predominantly anxious (possibly reflecting increased reactivity), predominantly psychotic (possibly reflecting dis-connectivity), and non-comorbid with other psychiatric symptoms (possibly reflecting better adaptation) (FIG. 1C). These subtypes need to be further evaluated and tested in independent cohorts for practical utility, diagnostic and therapeutic.

Step 2: Prioritization of Biomarkers Based on Prior Evidence in the Field

A Convergent Functional Genomics (CFG) approach was used to prioritize the candidate biomarkers identified in the discovery step (33% cutoff, internal score of ≥1 pt.) by using all the published prior independent evidence in the field (FIG. 1E). There were 3,590 probesets that had a CFG score (combined internal and external score) of 6 and above. These were carried forward to the validation step. This represented approximately a 15-fold enrichment of the probesets on the Affymetrix array.

Step 3: Validation of Biomarkers for Severe Stress State and Trait

These prioritized candidate biomarkers (n=3,590) were next analyzed in a demographically matched cohort of psychiatric participants with clinically severe state and trait stress, by assessing which markers were stepwise changed in expression from low stress to high stress to clinically severe state and trait stress (FIG. 1F). These genes were likely involved in stress state and trait. 2228 probesets were non-stepwise changed, 1130 were stepwise changed, and 232 were nominally significant by ANOVA. This represents approximately a 235-fold enrichment of the probesets on the Affymetrix array. The best p-value increased in expression (risk) biomarker was NUB1 (p=0.00062), and the best p-value decreased in expression (protective) biomarker was ASCC1 (p=0.00028). The Bonferroni threshold was set conservatively at 0.05/3,590=0.000014, and none of the biomarkers crossed that threshold.

Step 4: Testing for Diagnostics

The top biomarkers from each of the first three steps were carried over for further testing. The list of candidate biomarkers thus includes the top biomarkers from discovery step (>=90% of scores, n=39), the top biomarkers after the prioritization step (total CFG score>=13, n=21), and the nominally significant biomarkers after the validation step (n=232), for a total of n=285 probesets (n=269 genes) (FIGS. 1A-1G). The rationale for that was that there might be biomarkers that did not survive validation in the particular cohort and stringent stepwise change in expression approach, but have either an abundance of evidence from the literature supporting their involvement in stress and thus are highly prioritized at Step 2, and/or have strong evidence in the discovery Step 1 and might be completely novel candidate biomarkers for stress.

285 candidate biomarkers were tested to determine if they are able to predict stress severity state, and future psychiatric hospitalizations with stress, in another independent cohort of psychiatric participants. Biomarker levels information were used cross-sectionally, as well as expanded longitudinal information about biomarker levels at multiple visits, as predictors. The biomarkers in all participants in the independent test cohort were tested, as well as in a more personalized fashion by gender and psychiatric diagnosis, showing increased accuracy with the personalized approach, in particular in women (FIGS. 2A-2C). In general, the longitudinal information was more predictive than the cross-sectional information.

Across all participants tested, NUB1, the top risk biomarker after validation, was also the best predictor for high stress state (AUC 65%, p=0.0014). NUB1 was an even better predictor of stress state by gender in females (AUC 74%, p=0.004), and by gender and diagnosis in female bipolars (AUC 78%, p=0.02). NUB1 (Negative Regulator Of Ubiquitin Like Proteins 1), which was increased in expression in high stress states in this Example, has previous convergent evidence for increase in expression in stress, in human brain (nucleus accumbens in individuals exposed to social isolation before dying) and blood (individuals exposed to combat traumas), as well as in the brain of mice subjected to chronic variable stress. Such reproducibility across studies, tissues and populations provides strong reasons to consider it as a bona fide marker for psychological stress, and it serves as a reassuring de facto positive control for the design and power of this Example. Interestingly, NUB1 is also increased in expression in previous blood biomarker studies of suicide, in both males and females (Table 4). There was a strong clinical connection between stress and suicide.

APOL3 was the best predictor for trait first year future hospitalizations with stress (AUC 70%, p=0.0053). APOL3 was an even better predictor of first year future hospitalizations in males (AUC 71%, p=0.045), and by gender and diagnosis in male depression (AUC 92%, p=0.026). It also is a good predictor of all future hospitalizations with stress in male depression (OR 9.6, p=0.026). APOL3 (Apolipoprotein L3), decreased in expression in high stress states, has previous convergent evidence for decrease in expression in brain in mice subjected to stress. Interestingly, APOL3 is also decreased in expression in previous blood biomarker studies of suicide, in both males and females (Table 4).

MADIL1 the best predictor for trait all future hospitalizations with stress (OR 1.80, p=0.0013). MADIL1 was an even better predictor by gender and diagnosis in male bipolar (OR 2.1, p=0.0097) and male depression (OR 31.4, p=0.0055). MADIL1 (Mitotic Arrest Deficient Like 1), which is decreased in expression in high stress states, has previous convergent evidence for decrease in expression in blood in chronic stress. Of note, MADIL1 has strong previous genetic and gene expression data for involvement in autism, as well as in bipolar disorder and schizophrenia. It may mediate the impact of stress on those disorders.

NKTR (OR 1.37, p=0.000095) survived Bonferroni correction for all the 285 biomarkers tested. Importantly, NKTR (Natural Killer Cell Triggering Receptor), increased in expression in blood in high stress states, was also reported increased in expression in blood in studies of social isolation in humans, and in brain in studies of chronic variable stress in mice. NKTR is also increased in expression in previous blood biomarker studies of suicide, in both males and females, as well as increased in expression in postmortem brain studies in depression and in schizophrenia (Table 4), possibly underlying the effect of stress in those disorders.

By gender, in females, FOXK2 was the best predictor for state (AUC 88%, p=0.0039), PSD3 the best predictor for trait first year hospitalizations (AUC 98%, p=0.011) and C1orf123 for trait all future hospitalizations (OR 12.26, p=0.033). In males, PCDHB6 was the best predictor for state (AUC 65%, p=0.0072), APOL3 the best predictor for trait first year hospitalizations (AUC 71%, p=0.0045), and MADIL1 the best predictor for trait all future hospitalizations (OR 1.7, p=0.0027).

Personalized by gender and diagnosis, in female bipolar CIRBP was a strong predictor for state (AUC 100%, p=0.016), and in female schizoaffective HLA-DRB1 for trait all future hospitalizations (OR 39.23, p=0.041). In male schizophrenia, SNCA was a strong predictor for state (AUC 100%, p=0.014), in male depression STX11 was a strong predictor for trait first year hospitalizations (AUC 100%, p=0.00047), and in male depression ANK2 was a strong predictor for trait all future hospitalizations (OR 76.81, p=0.0081).

TL (Telomere Length), used as a comparator/positive control, was a good predictor for stress state and first year hospitalizations, particularly in males with depression (Table 2).

Across all participants tested, and in males, predictions of future hospitalizations with stress were in general somewhat stronger using phenotypic markers (such as the PTSD PCL-C scale and the VAS Stress scale) than biomarkers, but predictions were stronger using biomarkers than phenotypic markers in females, and personalized by gender and diagnosis. Also, panels of the validated biomarkers did not work as well as individual biomarkers, particularly when the later are tested by gender and diagnosis, consistent with there being heterogeneity in the population and supporting the need for personalization (data not shown).

Step 5: Biological Roles

Fifth, the top predictive biomarkers were assessed for evidence of involvement in other psychiatric and related disorders (Tables 2 and 5). A majority of the biomarkers have some evidence in other psychiatric disorders, consistent with the broad effect of stress on the brain and on mind domains/dimensions, whereas a few seem to be specific for stress, such as HLA-B (Major Histocompatibility Complex, Class I, B), LOC105378349 (Uncharacterized LOC105378349), and STX11 (Syntaxin 11). More than half of the top predictive biomarkers (26 out of 41 genes, i.e. 63%) have prior evidence for involvement in suicide, suggesting an extensive molecular co-morbidity between stress and suicide, to go along with the clinical and phenomenological co-morbidity.

Figure 3:
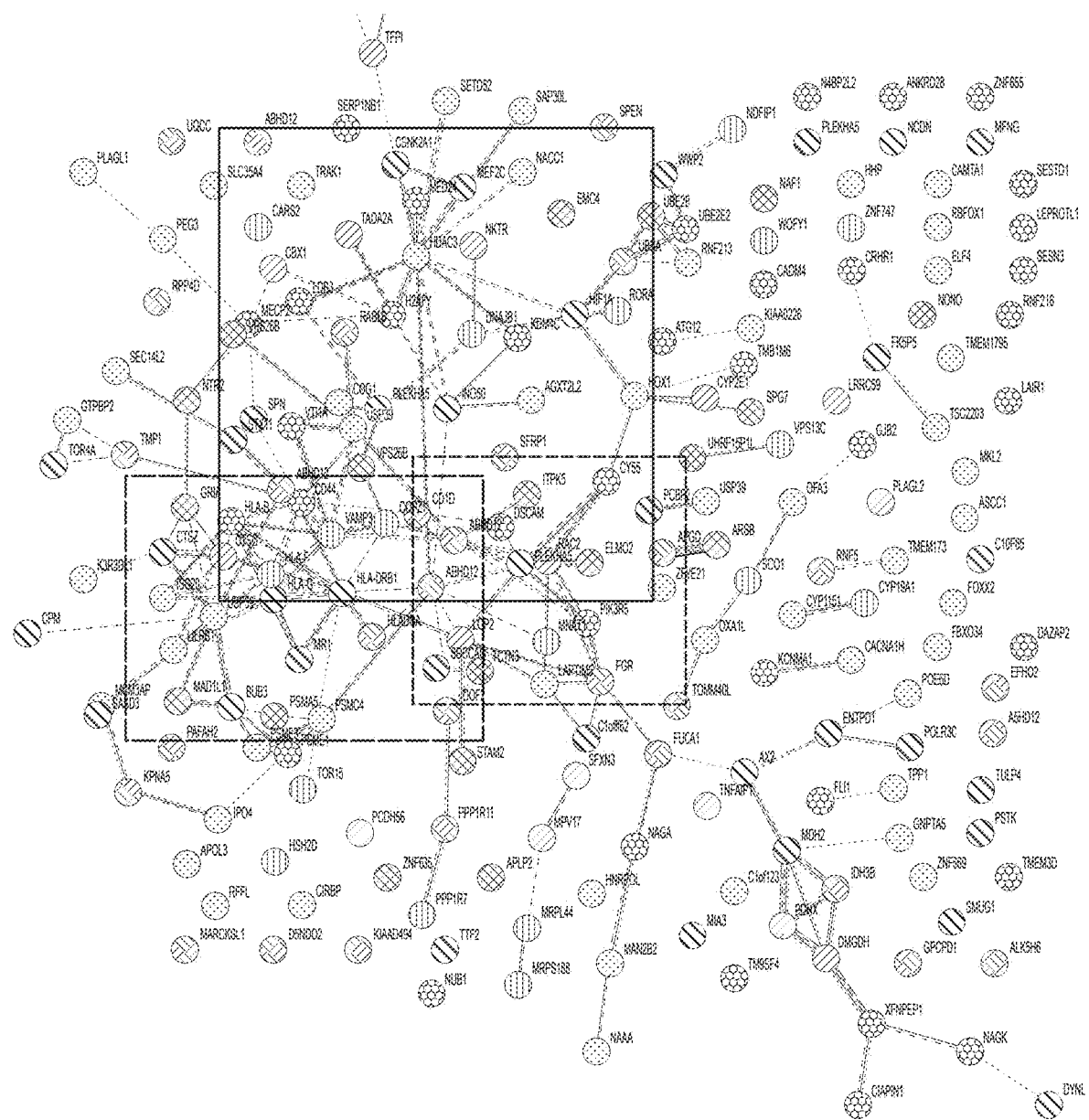
FIG. 3 depicts the STRING Interaction Network for nominally validated biomarkers for stress (n=220 genes, 232 probesets).

The biological pathways and networks in which the nominally validated biomarkers (n=232 probesets 220 genes) are involved were further analyzed. The top biological pathway is involved in antigen processing and presentation (Table 3), broadly speaking in the reaction to threats. The pathways are shared with other non-psychiatric diseases, suggesting that stress is a whole-body disease. There is a network centered on HLA DRB1 that may be involved in reactivity/immune response. A second network is centered on HDAC3, and may be involved in activity/trophicity. A third network is centered on RACI, and may be involved in connectivity/signaling. ACTR1A seems to be a nodal gene connecting these three networks. (FIG. 3).

Step 6: Targeted Treatments and Drug Repurposing

Sixth, the top predictive biomarkers as modulated by existing drugs (Tables 2 and 6) was analyzed. The validated biomarker signature, and out of them, the top predictive biomarkers gene expression signatures, were used to interrogate the Connectivity Map database from Broad/MIT to identify drugs and natural compounds that have the opposite effects on gene expression to stress, and can be repurposed for treating stress (Table 6). Reversing the gene expression signature in essence increases the expression of the resilience genes and decreases expression of the risk genes. The top drugs and nutraceuticals identified as potential new stress therapeutics are cefotiam (an antibiotic) and calcium folinate (a B vitamin) using all the validated biomarkers, ambroxol (originally a mucolytic drug, with recent evidence sodium channel blocker with anti-pain properties) and betulin (a triterpene compound from the bark of the birch tree, with evidence for anxiolytic effects) in all using the predictive biomarkers, as well as ozagrel (an antiplatelet agent working as a thromboxane A2 synthesis inhibitor) in males and flecainide (an antiarrhythmic agent that blocks sodium channels) in females.

Step 7: Convergent Functional Evidence (CFE)

The biomarkers with the best overall convergent functional evidence (CFE) across the six steps were FKBP5, DDX6, B2M, LAIR1, RTN4 and the previously mentioned NUB1 (Table 1). FKBP5 (FK506 Binding Protein 5), a decreased in expression biomarker, survived discovery, prioritization and validation. It seems to be a better predictor for state in females, and for trait in males, especially personalized by diagnosis. FKBP5 has independently been described as decreased in expression in blood in World Trade Center attack survivors and in a Dutch cohort with post-deployment PTSD30, as well as in postmortem brains from PTSD. FKBP5 appearance in the present screen is reassuring and serves as a de facto positive control for the approach. It is also involved in multiple other psychiatric disorders, consistent with the role of stress as a trigger or precipitant of illness (Table 4). There is previous evidence for its modulation in expression in opposite direction to stress by mood stabilizers (Table 3), and interestingly, by psychotherapy. DDX6 (DEAD-Box Helicase 6), an increased in expression biomarker, has previous convergent evidence of being increased in expression in blood and in amygdala of mice subjected to stress. It is a strong predictor of state and trait stress across all, by gender, and by gender and diagnosis. DDX6 has also been implicated in other neuropsychiatric disorders (alcoholism, other addictions, depression, schizophrenia), as well as is an increased in expression blood biomarker for suicide in previous studies. LAIR1 (Leukocyte Associated Immunoglobulin Like Receptor 1), a decreased in expression biomarker, survived discovery, prioritization and validation. It has previous convergent evidence from human studies of being decreased in expression in blood in PTSD related to childhood trauma and to interpersonal trauma in females. It is a strong predictor of state stress in females, and of trait stress across all and in males. LAIR1 is also a decreased in expression blood biomarker for suicide in previous studies. RTN4 (Reticulon 4), an increased in expression biomarker, has previous convergent evidence of being increased in the nucleus accumbens (NAC) in social isolation in humans, and in blood in PTSD. It is decreased in expression in blood by treatment with the nutraceutical omega-3 fatty acid DHA in stressed female mice in independent studies, as well as by valproate in brain of mice. RTN4 is a predictor of trait future hospitalizations with stress in all, as well as separately in males and females. RTN4 has also been implicated in bipolar disorder, alcoholism, and pain, as well as is an increased in expression suicide blood biomarker in our studies. B2M (Beta-2-Microglobulin), an increased in expression biomarker, has previous convergent evidence of being increased in the nucleus accumbens (NAC) in social isolation in humans, and it is decreased in expression in NAC by treatment with the nutraceutical omega-3 fatty acid DHA in stressed female mice in independent studies. It is a strong predictor of state stress in females with psychotic disorders, and of future hospitalizations with stress in both genders. B2M has also been implicated in other neuropsychiatric disorders (alcoholism, autism, depression, eating disorders, pain, as well as aging and suicide), possibly mediating the effects of stress in those disorders.

What is claimed is:

1. A computer-assisted method for assessing a high stress state in a subject, the method comprising:
   computing a score based on biomarker expression levels of two panels of blood biomarkers, in one or more samples obtained from the subject;
   computing a reference score based on reference biomarker expression levels obtained from a population of low stress state subjects for the two panels of blood biomarkers; and
   identifying a difference between the score in the one or more samples obtained from the subject and the reference score, wherein the difference in the score in the one or more samples obtained from the subject and the reference score indicates a risk for a high stress state in the subject;
   wherein a first panel of blood biomarkers comprises DEAD-Box Helicase 6 (DDX6), Beta-2-Microglobulin (B2M), and Reticulon 4 (RTN4) and an increased score in the first panel for the one or more samples obtained from the subject greater as compared to the reference score indicates a risk for a high stress state;
   wherein a second panel of blood biomarkers comprises FK506 Binding Protein 5 (FKBP5), Leukocyte Associated Immunoglobulin Like Receptor 1 (LAIR1), and MAD 1 Mitotic Arrest Deficient Like 1 (MADIL1) and a decreased score in the second panel for the one or more samples obtained from the subject as compared to the reference score indicates a risk for a high stress state;
   wherein upon the first panel, the second panel, or both the first and second panel indicating a risk for a high stress state, administering a treatment to the subject, wherein the treatment reduces the difference between the score in the one or more samples obtained from the subject and the reference score to mitigate the high stress state in the subject, and wherein a change in score upon administering the treatment indicates a response to the treatment; and
   wherein the treatment is a therapy selected in a computer-assisted fashion from the group consisting of one or more new compounds selected from the group consisting of: cefotiam, proguanil, hydroxyachillin, Prestwick-682, levopropoxyphene, isoflupredone, ozagrel, streptozocin, cyclopenthiazide, metformin, corticosterone, calcium folinate, diphenhydramine, dapsone, spiramycin, asiaticoside, ambroxol, xamoterol, betulin, isometheptene, primidone, tocainide, diloxanide, alprostadil, doxepin, diltiazem, estriol, molindone, and combinations thereof, each therapy selection based on one or more individual biomarkers of the first panel of blood biomarkers or the second panel of blood biomarkers.

2. The method according to claim 1, wherein the first blood biomarkers panel also comprises one or more additional the blood biomarkers selected from the group consisting of: Negative Regulator Of Ubiquitin Like Proteins 1 (NUB 1), Cytochrome P450 Family 2 Subfamily E Member 1 (CYP2E1), Ankyrin 2 (ANK2), MKL1/Myocardin Like 2 (MKL2), Dimethylglycine Dehydrogenase (DMGDH), NEDD4 Binding Protein 2 Like 2 (N4BP2L2), Protocadherin Beta 6 (PCDHB6), Gap Junction Protein Beta 2 (GJB2), Hypoxia Inducible Factor 1 Alpha Subunit (HIF1A), Forkhead Box K2 (FOXK2), Natural Killer Cell Triggering Receptor (NKTR), Pleckstrin Homology Domain Containing A5 (PLEKHA5), and Poly (RC) Binding Protein 2 (PCBP2).

3. The method according to claim 1, wherein the second blood biomarkers panel also comprises one or more additional the blood biomarkers selected from the group consisting of: 2'-5'-Oligoadenylate Synthetase 1 (OAS1), OXA1L, C-C Motif Chemokine Ligand 4 (CCL4), Dystrobrevin Binding Protein 1 (DTNBP1), Spondin 2 (SPON2), Leukocyte Associated Immunoglobulin Like Receptor 2 (LAIR2), Small Ubiquitin-Like Modifier 1 (SUMO1), Synuclein Alpha (SNCA), Pleckstrin And Sec7 Domain Containing 3 (PSD3), syntaxin 11 (STX11), Apolipoprotein L3 (APOL3), Engulfment And Cell Motility 2 (ELMO2), Conjugating Enzyme E2 E2 (UBE2E2), Major Histocompatibility Complex, Class II, DR Beta 1 (HLA-DRB 1), Lymphocyte Cytosolic Protein 2 (LCP2), Leucine Rich Repeat Containing 59 (LRRC59), Major Histocompatibility Complex, Class I, B (HLA-B), Chromosome 1 open Reading Frame 123 (C1orf123), Ubiquinol-Cytochrome C Reductase Complex Assembly Factor 1 (UQCC1), Dynactin Subunit 5 (DCTN 5), Dynactin Subunit 5 (DCTN5), and Uncharacterized LOC105378349 (LOC105378349).

4. The method according to claim 1, wherein the subject is a male subject, and the therapy is selected from the group consisting of: ozagrel, flucloxacillin, ambroxol, dapsone, tiaprofenic acid, primidone, betulin, proguanil, gossypol, levopropoxyphene, and combinations thereof, each therapy selection based on one or more individual biomarkers of the first panel of blood biomarkers or the second panel of blood biomarkers.

5. The method according to claim 1, wherein the subject is a female subject, and the therapy is selected from the group consisting of: flecainide, Prestwick-682, spiramycin, domperidone, homatropine, isoniazid, proguanil, phentolamine, sulfamonomethoxine, fludrocortisone, and combinations thereof, each therapy selection based on one or more individual biomarkers of the first panel of blood biomarkers or the second panel of blood biomarkers.

* * * * *